US005972255A

United States Patent [19]

Takada et al.

[11] Patent Number: 5,972,255

[45] Date of Patent: Oct. 26, 1999

[54] INJECTION STRETCH BLOW MOLDING APPARATUS AND METHOD WITH DISCHARGE GUIDE

[75] Inventors: Minoru Takada; Koichi Sato; Kazuyuki Yokobayashi, all of Ueda; Shuichi Ogihara, Komoro, all of Japan

[73] Assignee: Nissel ASB Machine Co., Ltd., Nagano-Ken, Japan

[21] Appl. No.: 09/052,217

[22] Filed: Mar. 31, 1998

Related U.S. Application Data

[62] Division of application No. 08/474,746, Jun. 7, 1995, Pat. No. 5,744,176.

[30] Foreign Application Priority Data

Sep. 16, 1994 [JP] Japan .................................... 6-248416

[51] Int. Cl.[6] ............................ B29C 31/08; B29C 49/06

[52] U.S. Cl. ............................ 264/39; 425/215; 425/522; 425/534

[58] Field of Search .................................... 425/215, 522, 425/534, 533, 169, 182, 529; 264/39, 532

[56] References Cited

U.S. PATENT DOCUMENTS

| | | | |
|---|---|---|---|
| 3,787,170 | 1/1974 | Gilbert | 425/526 |
| 3,910,741 | 10/1975 | Mehnert | 425/534 |

(List continued on next page.)

FOREIGN PATENT DOCUMENTS

| | | | |
|---|---|---|---|
| 0058947 | 9/1982 | European Pat. Off. . | |
| 0266804 | 5/1988 | European Pat. Off. . | |
| 0534367 | 3/1993 | European Pat. Off. . | |
| 2343588 | 10/1977 | France . | |
| 2389580 | 12/1978 | France . | |
| 2056617 | 6/1972 | Germany . | |
| 4033531 | 5/1992 | Germany . | |
| 4212115A1 | 6/1993 | Germany | 425/526 |
| 631654 | 8/1982 | Switzerland . | |
| 2062534 | 5/1981 | United Kingdom . | |
| 2093396 | 9/1982 | United Kingdom . | |
| 2097322 | 11/1982 | United Kingdom . | |

OTHER PUBLICATIONS

By E. Neumann, “Blasformen von Mehrwegflaschen.” in *Kunststoffe,* vol. 83, No. 5, May 1993, pp. 343–347, Germany.

By Haldenwanger, Mineif, Arnegger and Schuler, “Kunststoff–Motorbauteile in Ausschmelzkerntechnik am Beispiel Eines Saugrohres,” in *Automobiltechnische Zeitschrift,* vol. 89, No. 3, pp. 139–143, Mar. 1987, Germany.

Patent Abstracts of Japan, JP60180814, vol. 10, No. 21, (M–449), Katashi, “Stretching Blow Molding System,” Sep. 1985.

Patent Abstract, ES2058019, Reycobe SL, “Testing and Sorting Equipment for Plastic Bottles . . . ”, May 1992.

International Search Report.

*Primary Examiner*—Robert Davis

*Attorney, Agent, or Firm*—David L. Hoffman, Esq.; Cislo & Thomas LLP

[57] ABSTRACT

An injection stretch blow molding apparatus has a preform molding section for molding preforms and a blow molding section for blow molding containers from the preforms retaining heat from when the preforms were injection molded. At a location in a path along which the preforms are carried from the preform molding section to the blow molding section there is a discharge guide section for guiding preforms which are not to be carried to the blow molding section off the carrying path. A method wherein preforms are injection molded in preform molding section and these preforms are carried to a blow molding section and containers are blow molded from the preforms retaining heat from when the preforms were injection molded, includes the steps of switching to either a container molding operating mode using the above steps or a preform molding operation mode wherein part way along the preform carrying path leading to the blow molding section, the preforms being molded in the preform molding section are discharged from the carrying path.

3 Claims, 22 Drawing Sheets

U.S. PATENT DOCUMENTS 3,963,399 6/1976 Zavasnik .... 425/526
4,102,626 7/1978 Scharrenbroich .... 425/526
4,140,464 2/1979 Spurr et al. .... 425/533
4,140,468 2/1979 Duga .... 425/534
4,204,111 5/1980 Yonko .... 425/526
4,239,475 12/1980 Rainville .... 425/526
4,261,949 4/1981 Spurr et al. .... 264/535
4,310,282 1/1982 Spurr et al. .... 414/753
4,330,255 5/1982 Suzuki .... 425/529
4,391,578 7/1983 Schaar .... 425/534
4,405,556 9/1983 Valyi .... 425/533
4,412,806 11/1983 Gaiser et al. .... 425/533
4,522,581 6/1985 Schad et al. .... 425/534
4,690,633 9/1987 Schad et al. .... 425/526
4,693,375 9/1987 Schweers .... 425/534
4,729,732 3/1988 Schad et al. .... 425/526
4,747,769 5/1988 Nakamura et al. .... 425/529
4,793,960 12/1988 Schad et al. .... 264/535
4,810,278 3/1989 Braithwaite .... 65/267
4,929,450 5/1990 Takakusaki et al. .... 425/526
5,261,809 11/1993 Koga .... 425/534
5,297,950 3/1994 Kresak .... 425/534
5,308,237 5/1994 Kieran .... 425/534
5,352,402 10/1994 Orimoto et al. .... 264/526
5,424,022 6/1995 Koga .... 425/533
5,501,590 3/1996 Orimoto et al. .... 425/526
5,582,845 12/1996 Schad et al. .... 425/129.1
5,589,130 12/1996 Takada et al. .... 425/534
5,591,462 1/1997 Darling et al. .... 425/534

INJECTION STRETCH BLOW MOLDING APPARATUS AND METHOD WITH DISCHARGE GUIDE

CROSS-REFERENCE TO RELATED APPLICATIONS

This application is a divisional application of U.S. patent application Ser. No. 08/474,746 filed Jun. 7, 1995 and is now U.S. Pat. No. 5,744,176, which is incorporated by reference herein.

This application is also related to U.S. patent application Ser. No. 08/528,193 filed Sep. 14, 1995 and is now U.S. Pat. No. 5,753,279, which is incorporated by reference herein.

BACKGROUND OF THE INVENTION

This invention relates to an injection stretch blow molding apparatus and method wherein containers are stretch blow molded from preforms retaining heat from when they were injection molded. This invention also relates to an injection stretch blow molding apparatus and method wherein N ($N \geqq 2$) preforms are simultaneously injection molded and n ($1 \leqq n < N$) preforms among these are simultaneously blow molded into n containers. More particularly, the invention relates to an injection stretch blow molding apparatus and method with which while ample cooling time is provided the preforms can be molded with a shortened injection molding cycle time and furthermore the operation rate of the blow cavities can be increased. Also, this invention relates to constructions and methods for heating and adjusting the temperature of the preforms before they are blow molded. Also, this invention relates to an injection stretch blow molding apparatus and method with which it is possible when necessary to discharge the preforms to outside the apparatus instead of carrying them to the blow molding section.

Methods for blow molding a container from a preform (parison) include that known as the cold parison or 2-stage method and that which is known as the hot parison or 1-stage method. In both these methods, for injection molding the preforms required for the blow molding, at least an injection cavity mold which shapes the outer wall of the preform and an injection core mold which shapes the inner wall of the preform are necessary. Also, after the injection cavity mold and the injection core mold are clamped together and the preform is injection molded, with the molds still clamped together it is necessary to cool the preform down to a temperature at which the preform can be released from the molds.

Particularly in the case of the cold parison (2-stage) method, because this preform mold-release temperature has to be made quite low, the injection molding cycle time has been long and productivity has been poor. This is because when the preform is ejected by the injection cavity mold and the injection core mold being released from the preform and the preform being dropped or the like, it is necessary for the preform to be cooled to a mold-release temperature low enough for the preform not to be deformed when it makes contact with other members.

In the case of the cold parison method, because the preform molding step and the step in which a container is blow molded from this preform are completely release, the blow molding cycle time is not affected by the injection molding cycle time. However, because the cold parison method involves reheating preforms which have been cooled to room temperature the cold parison method is inferior to the hot parison method in its energy efficiency.

In a hot parison (1-stage) method injection stretch blow molding machine which draw blow molds bottles from preforms still containing heat from when they were injection molded the cycle time of the overall apparatus is determined by the injection molding cycle time, which of all the cycles is the one requiring the most time. Consequently there has been the problem that when the time required for injection molding is long, the throughput of the whole apparatus is low.

In the case of the hot parison method, although the preform is mold-released at a higher temperature than in the cold parison method, there is a limit on this mold-release temperature and consequently it is not possible to greatly speed up the injection molding cycle. One reason for this is that when the preform mold-release temperature is high, when the injection core mold is released from the preform, a mold-release called lifting, wherein the preform sticks to the core mold, occurs. Also, after the injection core mold is released from the preform, because there is no longer any member restricting deformation of the preform, deformation caused by temperature nonuniformity and thermal contraction and the like make it impossible for preforms conforming to the design to be ejected. Furthermore, when the cooling effected by the injection core mold is inadequate, crystallization caused by inadequate cooling occurs, particularly at the inner wall of the preform, and a preform of which the trunk portion is opaque is ejected.

Also, when preforms are ejected before they are completely cooled by the injection core mold and the injection cavity mold (with the preforms still at a temperature at which blow molding is possible) and blow molding is carried out thereafter, there have been the following problems:

(A) Unless the internal pressure (injection sustain pressure) is raised, shrink marks form at the injection cavity mold side of the preform and a preform with a uniform temperature distribution cannot be obtained. Consequently, when this preform is blow molded, a molded product with a uniform wall thickness distribution cannot be obtained.

(B) When the internal pressure (injection sustain pressure) is raised, a pressure differential forms between the gate portion and the preform end portion (for example the neck portion), and the resulting preform has large residual stresses at the preform bottom end where the pressure was high. Consequently, when the preform is blow molded, a molded product with a uniform wall thickness distribution cannot be obtained.

(C) When the preform is cooled by the injection core mold and the injection cavity mold, as the cooling progresses the preform contracts and tends to move away from the injection cavity surface. Because of this, there are some parts of the outer wall surface of the preform which are in contact with the injection cavity and some parts which are not in contact with the injection cavity, and consequently different parts of the preform cool at different rates and the temperature becomes uneven. As a result, when this preform is blow molded, a molded product of uniform wall thickness cannot be obtained.

Thus, in a conventional hot parison system, unless the preform is amply cooled by the injection cavity mold and the injection core mold it has not been possible to obtain good blowing characteristics or good bottle characteristics. Because of this, the injection molding of the preforms has required time, and the throughput of the apparatus has been low.

Various other problems have also been associated with injection stretch blow molding machines using the hot parison method, including the following:

When in order to increase the throughput the number N of preforms injection molded simultaneously is increased, the same number N of cavities conforming to the external shape of the bottles being manufactured have to be formed in the blow cavity mold. Of the molds used in a blow molding machine the blow cavity mold is the most expensive, and the cost of this blow cavity mold increases roughly in proportion to the number of cavities in it. Even if a mold is expensive, if its operation rate is high then it can be used cost-effectively; however, because as described above the cycle time of the overall apparatus depends on the injection molding cycle time and cannot be shortened, the operation rate of each cavity in the blow cavity mold has unavoidably been low. Also, when the number of bottles blow molded simultaneously increases, not only the number of cavities in the blow mold but also the number of drawing rods and blow core molds and mechanisms for supporting and driving these increases, and this has resulted in increases in the size and cost of the apparatus.

Another problem has been that conventionally it has not been possible to eject the preforms unless the injection core mold is completely pulled out of the preforms, and consequently with a rotary injection molding apparatus it has not been possible to carry the preforms from the injection molding section to the next stage. When on the other hand the injection core mold is completely pulled out of the preforms, there has been the problem that this pullout stroke is long and the overall height of the apparatus is high.

Another problem has been that when hot parison blow molding is carried out by a rotary carrier type blow molding machine the injection molded preforms are always carried by the rotary carrier to the blow molding section. Here, for example when a problem has arisen in the blow molding section, there has been no alternative but to shut down the preform injection molding as well as the blow molding section. However, once the injection molding section is shut down, a long starting-up time is required when it is restarted. This is because the injection apparatus contains numerous resin-heating mechanisms in the hot runner mold and elsewhere.

As a result, as well as it not being possible to raise the throughput of the overall apparatus, as described above, a lot of time is required for starting up the apparatus when a problem has arisen, and the productivity falls even further.

Accordingly, it is an object of the invention to provide an injection stretch blow molding apparatus and method with which while ample preform cooling time is provided the injection molding cycle time can be shortened and the cycle time of the overall apparatus can thereby be shortened.

Another object of the invention is to provide a highly efficient injection stretch blow molding apparatus and method with which while reducing costs by reducing the number of cavities in the blow mold the operation rate of the blow mold can be increased.

Another object of the invention is to provide an injection stretch blow molding apparatus and method which while exploiting the heat energy efficiency of hot parison molding also has the preform temperature distribution stability of the cold parison method.

Another object of the invention is to provide an injection stretch blow molding apparatus and method with which temperature nonuniformity and deformation can be prevented even when the preform mold-release temperature at which the preforms are released from the injection cavity mold is made high and furthermore the preforms can be amply cooled before they are released from the injection core mold and can be stably blow molded thereafter at a suitable blow molding temperature.

A further object of the invention is to provide an injection stretch blow molding apparatus and method with which the temperature difference between the inner and outer walls of the preforms is moderated before the preforms are blow molded.

A further object of the invention is to provide an injection stretch blow molding apparatus with which general-purpose medium-sized containers of capacity 1 to 3 liters can be blow molded with high efficiency.

A further object of the invention is to provide a blow molding apparatus with which it is possible to efficiently heat the regions below the necks of the preforms to a suitable blow molding temperature.

A further object of the invention is to provide a blow molding apparatus with which it is possible to moderate the temperature difference between the inner and outer walls of the preforms and also use this time provided for temperature moderation to adjust the temperature of the preforms to a suitable blow molding temperature before blow molding is carried out.

A further object of the invention is to provide an injection stretch blow molding apparatus and method which can be started up without any wasteful blow molding being carried out at the time of start-up and with which it is not necessary to stop the operation of the whole apparatus when there is a problem in the blow molding section.

An injection stretch blow molding apparatus according to the invention comprises:

a preform molding station for injection molding preforms;

a blow molding station for stretch blow molding the preforms into containers; and a transfer station for transferring the preforms from the preform molding station to the blow molding station, wherein the preform molding station comprises:

a circulatory carrier for intermittently circulatorily carrying along a carrying path a plurality of injection core molds disposed apart;

an injection molding section for injection molding the preforms having an injection cavity mold together with which the injection core molds, stopped in the carrying path, are severally clamped; and an ejecting section for ejecting preforms from the injection core molds by releasing the injection core molds, stopped in the carrying path, and the preforms.

An injection stretch blow molding method according to the invention for blow molding containers from preforms retaining heat from when the preforms were injection molded comprises the steps of:

releasing the preforms, molded using at least an injection core mold and an injection cavity mold, from the injection cavity mold;

with the preforms held by the injection core mold, carrying the injection core mold to an ejecting section along a carrying path while the preforms are cooled by the injection core mold;

in the ejecting section, ejecting the preforms by releasing the injection core mold therefrom; and thereafter, blow molding the containers from the preforms retaining heat from when the preforms were injection molded.

According to these inventions, the preforms injection molded in the injection molding section are cooled by the injection cavity mold and the injection core mold and then the injection cavity mold only is released from the preforms. After that, the preforms are carried to the preform ejecting section by the injection core mold. The preforms are ejected after being cooled by the injection core mold during this carrying and in the preform ejecting section. As a result, by the preforms being cooled by the injection core mold even after the injection cavity mold is mold-released in the injection molding section, ample preform cooling time is provided. Therefore, the preform mold-release temperature at which the preforms are released from the injection cavity mold can be made high, the injection molding cycle time can thereby be shortened and the cycle time of the overall apparatus can be shortened. Also, even when the preforms are released from the injection cavity mold at a high temperature, deformation of the preforms is prevented by the injection core mold. Furthermore, not only does the cooling efficiency increase because the preforms contract into contact with the injection core mold as they are cooled, and consequently crystallization and loss of transparency of the trunk portions of the preforms caused by inadequate cooling is prevented, but also by thus stabilizing the cooling process it is possible to stabilize the amount of heat retained by the preforms and thereby stabilize the wall thickness distributions of successively blow molded containers.

According to another aspect of the invention, an injection stretch blow molding apparatus comprises:

a preform molding station for injection molding preforms;

a blow molding station for stretch blow molding the preforms into containers; and a transfer station for transferring the preforms from the preform molding station to the blow molding station, wherein the preform molding station comprises:

a first circulatory carrier for intermittently circulatorily carrying along a first carrying path an injection core mold having N($N \geqq 2$) of core pins disposed apart;

an injection molding section for simultaneously injection molding N of the preforms, said injection molding section having an injection cavity mold including N of cavities in which the injection cavity mold is clamped together with the injection core mold stopped in the first carrying path; and an ejecting section for ejecting preforms from the injection core mold by releasing from the injection core mold, stopped in the first carrying path, and the blow molding station comprises:

a second circulatory carrier for intermittently circulatorily carrying along a second carrying path the preforms transferred from the preform molding station by the transfer station; and a blow molding section for simultaneously blow molding n ($1 \leqq n < N$) of containers from n of the preforms, said blow molding section having a blow mold including n of blow cavities in which the blow mold is clamped around the preforms stopped in the second carrying path.

According to another aspect of the invention, an injection stretch blow molding method for molding containers from preforms retaining heat from when the preforms were injection molded, comprising the steps of:

releasing N ($N \geqq 2$) of the preforms, molded using at least an injection core mold and an injection cavity mold, from the injection cavity mold;

with the preforms held by the injection core mold, carrying the injection core mold to an ejecting section along a first circulatory carrying path while the preforms are cooled by the injection core mold;

in the ejecting section, ejecting the preforms by releasing from the injection core mold;

transferring the ejected preforms to carrier members to be carried along a second circulatory carrying path;

carrying the carrier members supporting the preforms along the second carrying path to a blow molding section; and in the blow molding section, simultaneously blow molding n ($1 \leqq n < N$) of containers from n of the preforms in a blow mold clamped around n of the preforms.

According to these inventions, the inventions provide the following operations and effects in addition to those of the inventions as described above: Because the number n of preforms simultaneously blow molded is made smaller than the number N of preforms simultaneously injection molded, fewer cavities are required in the blow mold and mold costs, molds being consumable items, can be greatly reduced. Also, because fewer blow core molds, stretching rods, and mechanisms for supporting and driving these are required, the apparatus can be made more compact and cheaper. Furthermore, because N simultaneously molded preforms are blow molded n ($n \leqq N$) at a time over a plurality of blow molding cycles within the shortened injection molding cycle time, the operating rate of the n cavities in the blow cavity mold increases.

Here, a heating section for heating the preforms being carried to the blow molding section can be provided. When this is done, the preforms can be brought to a temperature suitable for blow molding by cooling performed by the injection molds and reheating of the cooled preforms, and the temperature stability from cycle to cycle therefore increases. Also, even though N simultaneously injection molded preforms are blow molded n preforms at a time over (N/n) blow molding cycles, control reducing the temperature variation among blow molding cycles can easily be carried out.

Also, when the preforms being heated are rotated about their vertical center axes, heating unevenness is reduced and temperature nonuniformity in the circumferential direction of the preforms can thereby be reduced.

Furthermore, a second circulatory carrier comprises a plurality of carrier members which remain spaced at equal intervals along the second carrying path, and each of the carrier members has a supporting portion for supporting a preform in an inverted or an upright state. It is preferable that the array pitch at which the plurality of carrier members are spaced along the second carrier path be made equal to the array pitch P of the plurality of cavities in the blow cavity mold. This is because it makes pitch conversion in the carrying process unnecessary. When this is done, the array pitch of the preforms in the heating section of the invention is greater than the small pitch at which the preforms are arrayed in the heating section in a conventional 2-stage system. However, because in this invention it is only necessary to give the preforms a small amount of heat energy in addition to the heat which they retain from when they were injection molded, the heating time can be short and the length of the heating section does not have to be made long as it does in the cold parison case.

Also, in the method of this invention, a step of allowing the preforms to cool between the separation of the preforms from the injection core mold and the start of the blow molding step, over a period of time long enough for the temperature difference between the inner and outer walls of the preforms to be moderated, can be provided. Here, when the method of this invention is applied, because the period of time for which the preforms are cooled by the injection core mold in contact with their inner walls is made longer than conventionally, a relatively steep temperature gradient forms between the inner and outer walls of the preforms, and the temperature in the outer wall vicinity becomes greater than that in the inner wall vicinity. By providing this cooling step, this temperature gradient can be moderated and the inner and outer walls of the preforms can be brought to a temperature suitable for blow molding.

Also, in the method of this invention, it is preferable that in the blow molding step n (n≧2) containers simultaneously be blow molded from n preforms using n blow cavities arrayed at a blow molding pitch P, that the preforms being carried along the second carrying path be carried with the array pitch of the carrier members kept equal to this pitch P, and that in the preform transferring step a process wherein n preforms are simultaneously transferred to n carrier members is repeated a plurality of times.

When this is done, as well as no carrying pitch conversion in the second carrying path being necessary, even if the number of preforms simultaneously injection molded N is increased, because only n preforms are transferred at a time, fewer than when N preforms are simultaneously transferred, the preforms can be easily correctly positioned on the carrier members, and also no complex mechanisms are required to do this.

According to another aspect of the invention, an injection stretch blow molding method wherein injection molded preforms are transferred from a preform molding station to a blow molding station by way of a transfer station and the preforms are blow molded into containers in the blow molding station is characterized in that:

in the preform molding station the preforms are injection molded in an upright state with open neck portions thereof facing upward;

the transfer station turns the upright preforms upside-down and transfers the preforms to the blow molding station in an inverted state; and the blow molding station blow molds containers from the inverted preforms.

According to the invention, the preforms are molded in an upright state with their neck portions facing upward. As a result, the injection mold clamping is vertical clamping and is therefore space-saving. Also, because resin is normally injected from the preform bottom portion side, a stable arrangement wherein the injecting apparatus and the injection cavity mold are disposed on a machine bed and the injection core mold is disposed thereabove can be employed. Also, because when the preforms are carried to the blow molding station they are in an inverted state, the openings at their neck portions can be used to have the preforms support themselves easily. Furthermore, because the drawing rods and blow core molds consequently have to be positioned underneath the preforms, they can be disposed using a space in the machine bed and the overall height of the blow molding section can be made low.

According to another aspect of the invention, an injection stretch blow molding method comprises the steps of:

simultaneously injection molding N of preforms made of polyethylene terephthalate using at least an injection core mold and an injection cavity mold;

releasing the preforms from the injection cavity mold;

carrying the preforms to an ejecting section while cooling the preforms by means of the injection core mold;

in the ejecting section, after the preforms have been cooled to a predetermined temperature, ejecting the preforms from the injection core mold;

heating the ejected preforms to a predetermined temperature; and thereafter, simultaneously blow molding n of containers from n of the preforms, wherein the ratio of the numbers N and n is N:n=3:1.

According to experiments carried out by the present inventors, in the case of a general-purpose medium-sized container of capacity 1 to 3 liters having a relatively small mouth (the diameter of the opening in the neck portion 2 being about 28 to 38 mm) for which the market demand is large, the ratio of the simultaneous molding numbers N, n should ideally be set to N:n=3:1. That is, it has been found that in the case of this invention wherein the preforms continue to be cooled by the injection core mold even after the preforms are removed from the injection cavity mold and then blow molded thereafter, the time required for the injection molding of a preform for a general-purpose medium-sized container is shortened to approximately ¾ of that in the case of a conventional injection stretch blow molding apparatus, and an injection molding cycle time of approximately 10 to 15 seconds is sufficient. A blow molding cycle time, on the other hand, of 3.6 to 4.0 seconds is sufficient. Therefore, if this injection molding cycle time is T1 and the blow molding cycle time is T2, the ratio T1:T2 is roughly 3:1, and to mold general-purpose medium-sized containers efficiently the simultaneous molding numbers N, n should ideally be set according to this ratio.

According to another aspect of the invention, an injection stretch blow molding method comprises the steps of:

simultaneously injection molding N (N≧2) of preforms; and simultaneously blow molding n (1≦n<N) of containers from n of the preforms retaining heat from when the preforms were injection molded, wherein N/n is an integer when the injection and blow molding steps are repeated.

When N/n is an integer, for example the N preforms simultaneously injection molded in a first cycle are all used over an integral number (N/n) of blow molding cycles n at a time, and none of these preforms are mixed with and simultaneously blow molded with any of the N preforms simultaneously molded in the subsequent second cycle. If preforms from different injection molding cycles are mixed and blow molded together, the carrying sequence is different from the case wherein preforms molded in the same injection molding cycle are simultaneously blow molded together, and the control and structure of the apparatus become complicated; however, this invention eliminates this problem.

According to another aspect of the invention, a blow molding apparatus wherein preforms carried in an inverted state with neck portions thereof facing downward or in an upright state with the neck portions facing upward are heated in a heating section before being carried to a blow molding section is characterized in that:

the heating section comprises:

a plurality of first heaters disposed at one side of a preform carrying path, spaced apart in a vertical direction and extending in a preform carrying direction;

a reflecting plate disposed facing the first heaters across the preform carrying path; and a plurality of second heaters extending in the preform carrying direction on both sides of the preform carrying path, wherein the second heaters are positioned at such a height in the vertical direction that they face regions subject to blow molding in the vicinities of the neck portions of the preforms.

According to the invention, although the region below the neck portion when the preform is upright is the nearest to the cavity surface of the blow cavity mold, it is a region which is to be draw orientated relatively much. By heating this region with the second heaters on either side of the preform, it can be heated to a higher temperature than the trunk portion region heated by the first heaters disposed on one side only, and a high drawing orientation degree can be secured. Also, because the first heaters are disposed on one side only, the arrangement is saving. Furthermore, because the efficiency with which the region below the neck is heated increases, there is the benefit that the heating time can be shortened and the overall length of the heating section can be made short.

According to another aspect of the invention, a blow molding apparatus comprises:

carrier members which support and intermittently circulatorily carry preforms;

a heating section having heaters extending in a preform carrying direction;

an endless carrying member running along the preform carrying direction at least through a heating zone of the heating section; and a driver for driving the endless carrying member in a forward direction, wherein each of the carrier members has a rotary driven member for meshing with the endless carrying member and a preform supporting portion which rotates integrally with the rotary driven member, and the forward direction of the endless carrying member where it meshes with the rotary driven members is opposite to the preform carrying direction.

According to the invention, while the preforms are stopped the preforms are rotated in one direction by the meshing of the endless carrying member moving forward in a fixed direction and the rotary driven member rotated in a fixed position, and temperature nonuniformity of the preforms can thereby be prevented. Also, when the preforms are moving, because the endless carrying member moves forward in the opposite direction to that in which the preforms are being carried, the preforms are rotated faster in the same direction and temperature nonuniformity is similarly prevented. If the endless carrying member were to move forward along with the preforms in the same direction as the rotary driven member, because the preforms would only be rotated by the speed differential between the endless carrying member and the rotary driven member, the preforms would rotate slowly or not at all. Also, there would be cases wherein the direction of the rotation of the preforms was different from that as of when the preforms were stopped. All these situations would cause temperature nonuniformity in the preforms; however, according to the invention, this temperature nonuniformity is eliminated.

According to another aspect of the invention, a blow molding apparatus wherein preforms are intermittently carried to a blow molding section via a heating section is characterized in that:

the heating section comprises a heater extending in a preform carrying direction at one side of a preform carrying path, and in the carrying path between the heating section and the blow molding section a standby section is provided where at least enough number of preforms for one blow molding cycle are stopped and made to standby before being carried into the blow molding section.

According to one embodiment of the invention, by a standby section being provided before the blow molding section, the temperature distributions in the synthetic resin preforms, which have poor thermal conductivity, can be moderated. Normally, because heating in the heating section is carried out from around the preforms, the inner wall temperature of the preforms becomes lower than the outer wall temperature. By having at least the number of preforms simultaneously blow molded standby after being heated in order to moderate the resulting temperature gradients therein, the blow molding characteristics are stabilized.

Also, by actively carrying out temperature adjustment on the preforms during this temperature moderation time in the standby section, the preforms can be given a temperature distribution for blow molding which could not be obtained just by simply heating the preforms while rotating them.

According to another aspect of the invention, an injection stretch blow molding apparatus comprising a preform molding section for molding preforms and a blow molding section for blow molding containers from the preforms retaining heat from when the preforms were injection molded is characterized in that:

at a location in a path along which the preforms are carried from the preform molding section to the blow molding section there is provided a discharge guide section for guiding preforms which are not to be carried to the blow molding section off the carrying path.

According to another aspect of the invention, an injection stretch blow molding method wherein preforms are injection molded in a preform molding section and these preforms are carried to a blow molding section and containers are blow molded from the preforms retaining heat from when the preforms were injection molded comprises the steps of:

switching to either a container molding operating mode or a preform molding operating mode; and when the preform molding operating mode is switched to, part way along the preform carrying path leading to the blow molding section, discharging the preforms being molded in the preform molding section to off the carrying path.

According to these inventions, because it is possible to discharge imperfect preforms molded during molding start-up instead of carrying them to the blow molding section, wasteful blow molding can be avoided. Also, when a problem arises in the blow molding section or when adjustments have to be made thereto, repair or adjustment of the blow molding section is possible without stopping the operation of the preform molding station. Once the preform molding station is shut down, it takes a long time to restore the various heating mechanisms to a state wherein molding is possible; however, with this invention this kind of wasteful starting up time is eliminated.

DETAILED DESCRIPTION OF THE PREFERRED EMBODIMENTS

A preferred embodiment wherein the method and apparatus of the invention are applied will be described below with reference to the accompanying drawings.

Overall Constitution of the Apparatus

Figure 1:
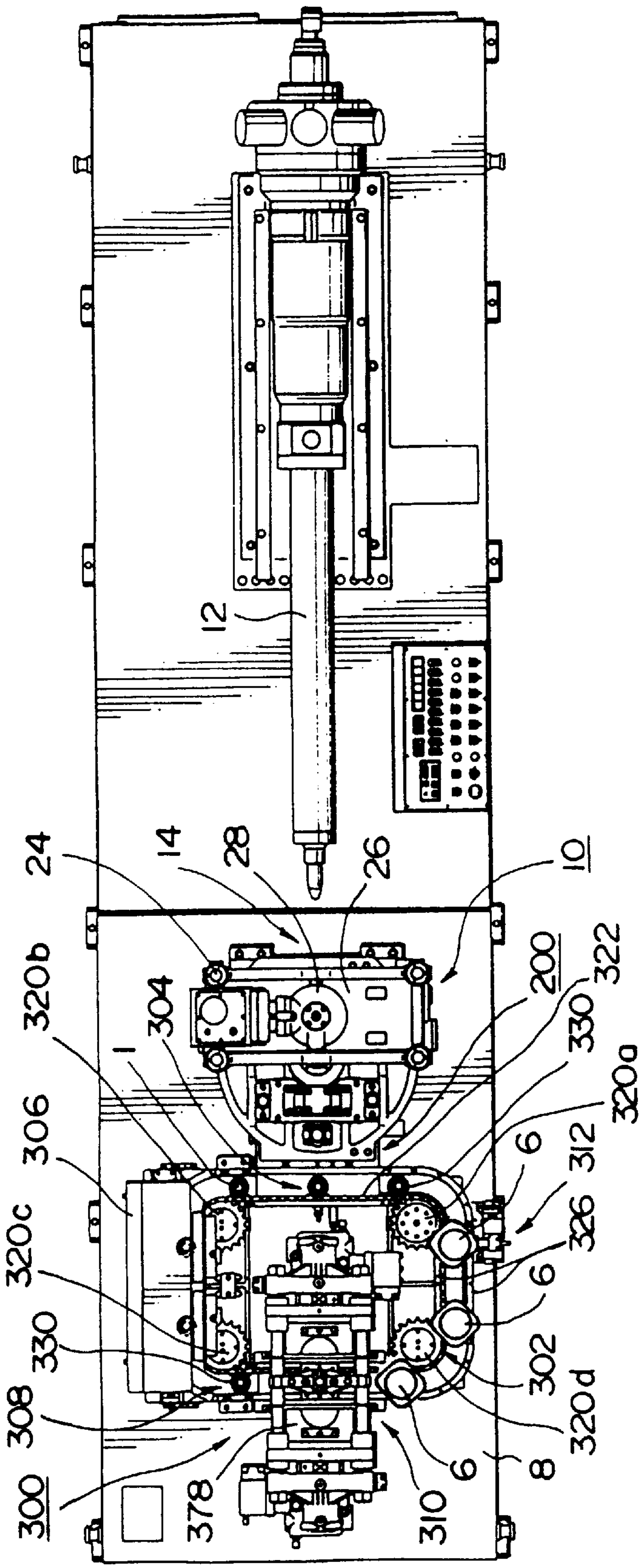
FIG. 1 is a plan view of a preferred embodiment of the invention.
Figure 2:
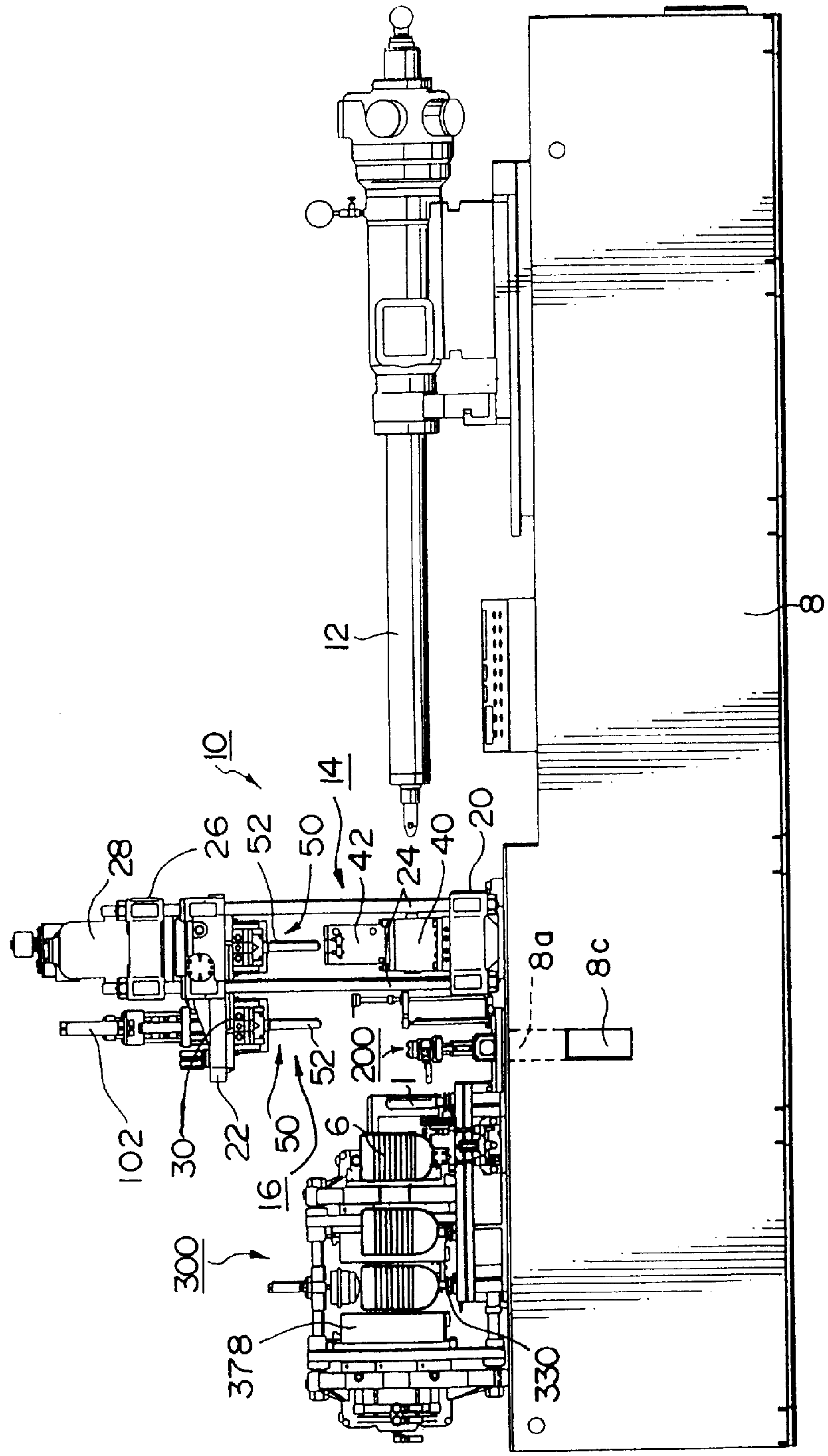
FIG. 2 is a front view of the preferred embodiment apparatus shown in FIG. 1.
Figure 3:
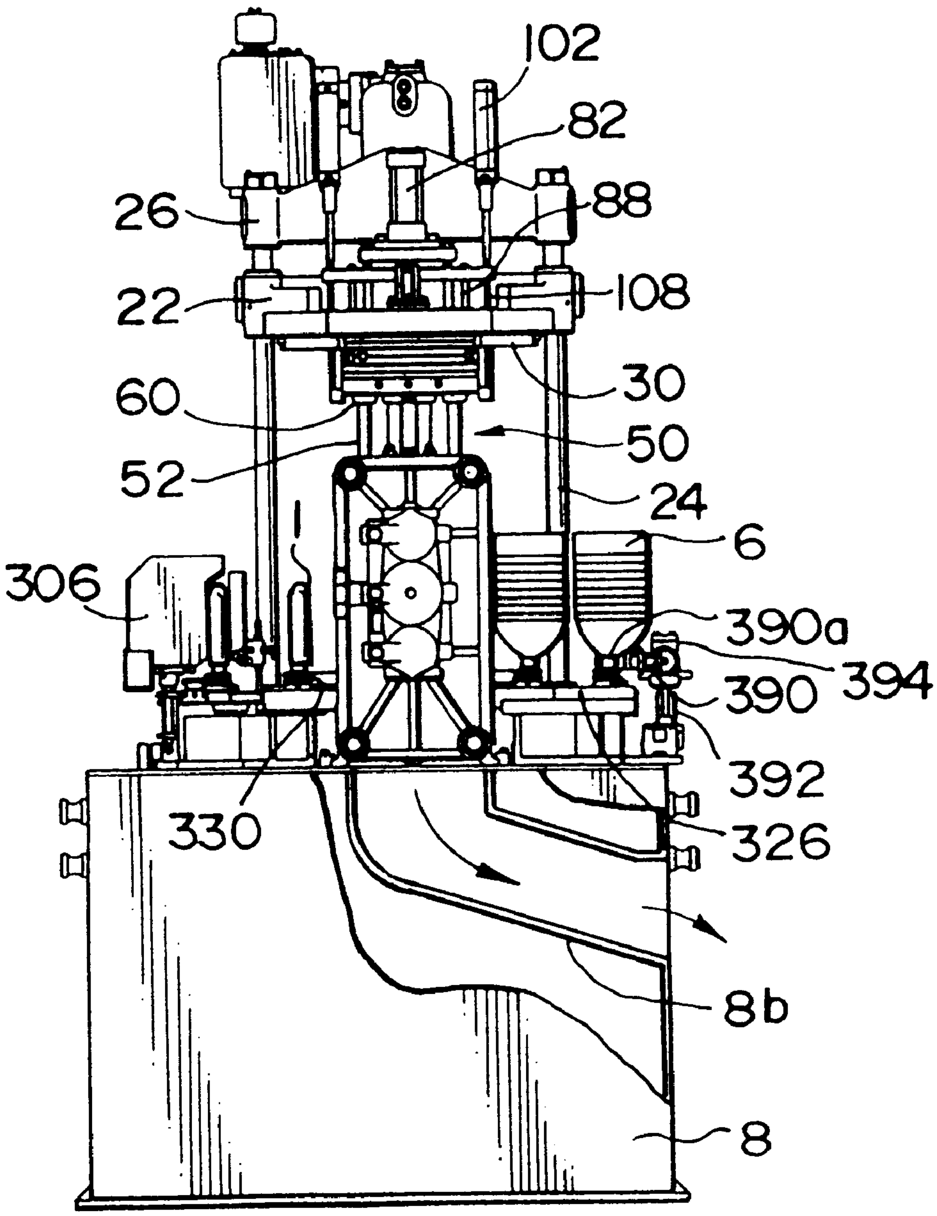
FIG. 3 is a left side view of the preferred embodiment apparatus shown in FIG. 1.
Figure 4:
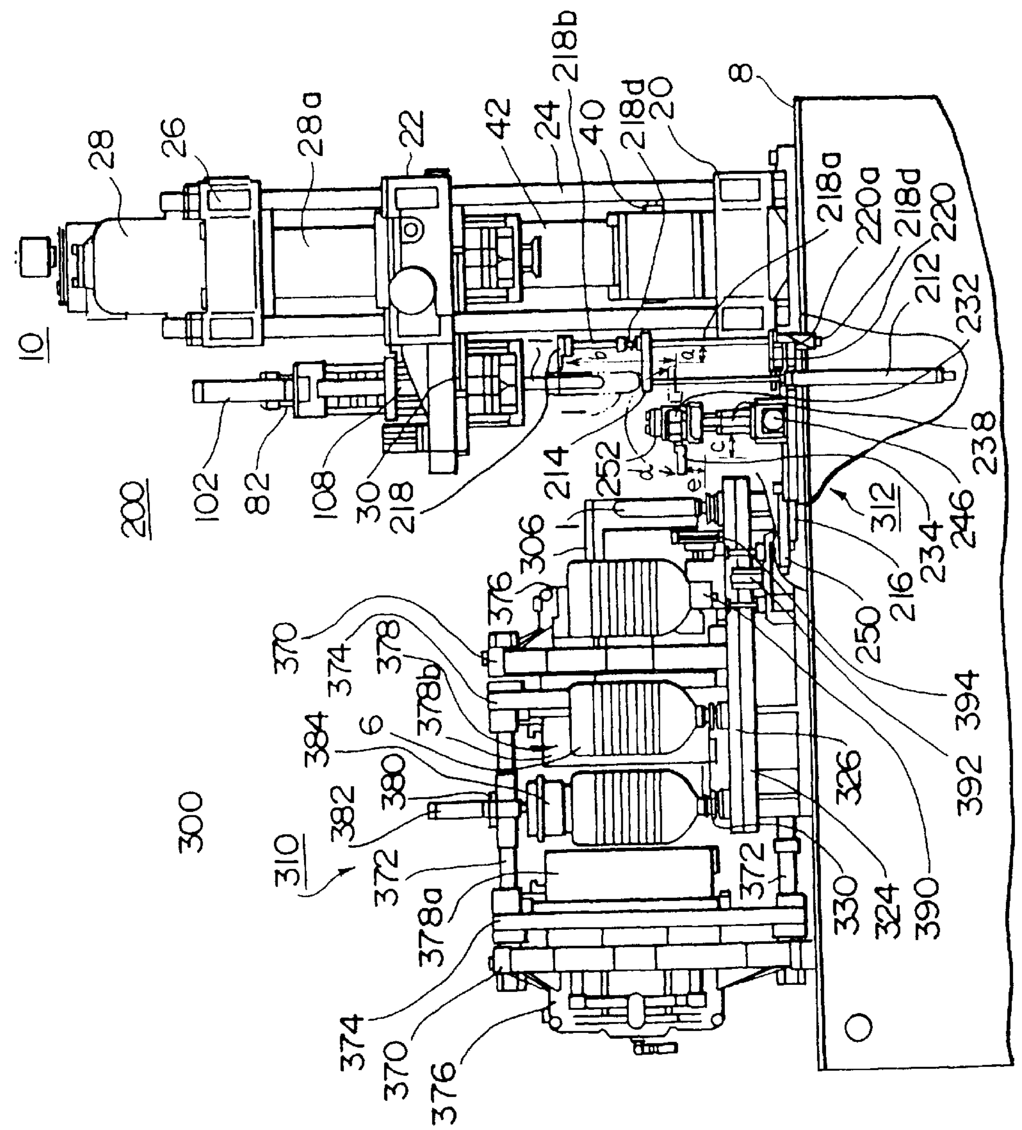
FIG. 4 is an enlarged view of the main parts of the apparatus shown in FIG. 1.

FIG. 1, FIG. 2 and FIG. 3 respectively are a plan view, a front view and a left side view of the apparatus of this preferred embodiment, and FIG. 4 is an enlarged view showing the main parts of the apparatus of the preferred embodiment. As shown in the drawings, the apparatus comprises a preform molding station 10, a transfer station 200 and a blow molding station 300 disposed on a machine bed 8.

As shown in FIG. 2, the preform molding station 10 has a rotary disc 30 which has an injection core mold 50 in each of two locations an angle of rotation 180° apart and is a first circulatory carrier which circulatorily carries the injection core molds 50 intermittently along a rotary carrying path. An injection molding section 14 facing an injecting apparatus 12 and a preform ejecting section 16 facing this injection molding section 14 are respectively provided at the stopping positions of the injection core molds 50. The injection molding section 14 has an injection cavity mold 42 to which an injection core mold 50 can be clamped, and with this injection cavity mold 42 the injection molding section 14 simultaneously injection molds N ($N \geqq 2$), for example N=4, preforms 1 at a time. In the preform ejecting section 16, the injection core mold 50 is released from the preforms 1. In this preferred embodiment, a neck portion of each preform 1 is molded by means of a neck cavity mold 60 which will be further discussed later, and the preforms 1 are held by this neck cavity mold 60 and the injection core mold 50 and carried by the rotary disc 30 to the preform ejecting section 16. In the preform ejecting section 16 the preforms 1 are ejected by being released from the neck cavity mold 60 after a partial release of the injection core mold 50.

As shown in FIG. 1, the blow molding station 300 has a second circulatory carrier 302 comprising four sprockets 320*a* to 320*d* and a carrier chain 322 running around these sprockets. A plurality of for example ten carrier members 330 are fixed to this carrier chain 322 uniformly spaced apart, and a preform 1 or a bottle 6 is supported by each carrier member 330. In the carrying path of the carrier members 330 are provided a preform receiving section 304 which receives the preforms 1 from the transfer station 200, a heating section 306 which heats the preforms 1, a standby section 308 which causes the heated preforms 1 to temporarily standby, a blow molding section 310 which blow molds the preforms 1 into bottles 6, and a bottle ejecting section 312 which ejects the bottles 6 to outside the apparatus.

The blow molding section 310 has a blow mold 378 which is clamped around the preforms 1 and blow molds one bottle 6 from each of n ($1 \leqq n < N$) preforms 1, for example n=1 preform 1.

The transfer station 200 transfers the preforms 1 ejected from the preform ejecting section 16 of the preform molding station 10 to the preform receiving section 304 of the blow molding station 300. In the preform ejecting section 16 of the preform molding station 10 N preforms 1, i.e. the number of preforms 1 simultaneously molded in the injection molding section 14, are ejected at a time, but in the transfer station 200 n preforms 1, i.e. the number of preforms 1 simultaneously molded in the blow molding section 310 of the blow molding station 300, are transferred at a time. In the apparatus of this preferred embodiment, four preforms 1 simultaneously ejected by the preform ejecting section 16 are transferred one at a time to the preform receiving section 304. Also, whereas in the preform molding station 10 the preforms 1 are injection molded in an upright state, in the transfer station 200 the preforms 1 are turned upside-down and transferred to the blow molding station 300 in an inverted state.

Preform Molding Station 10

First the preform molding station 10 will be described, with reference to FIG. 1 to FIG. 11.

Injection Molding Section 14 and First Circulatory Carrier 30

As shown in FIG. 2 and FIG. 4, the injection molding section 14 of the preform molding station 10 is provided with a lower clamping plate 20 mounted on the machine bed 8. A for example circular upper clamping plate 22 is disposed above this lower mold clamping plate 20 and extends from the injection molding section 14 into the preform ejecting section 16. This upper mold clamping plate 22 is movable vertically along four tie bars 24 provided in four locations around the injection molding section 14. As shown in FIG. 1, FIG. 2 and FIG. 4, a fixed plate 26 is mounted on the upper ends of the tie bars 24 and a clamping cylinder 28 is mounted on this fixed plate 26. The clamping cylinder 28 drives a clamping rod 28*a* (see FIG. 4), and the upper clamping plate 22 is driven up and down by this clamping rod 28*a*.

Figure 5:
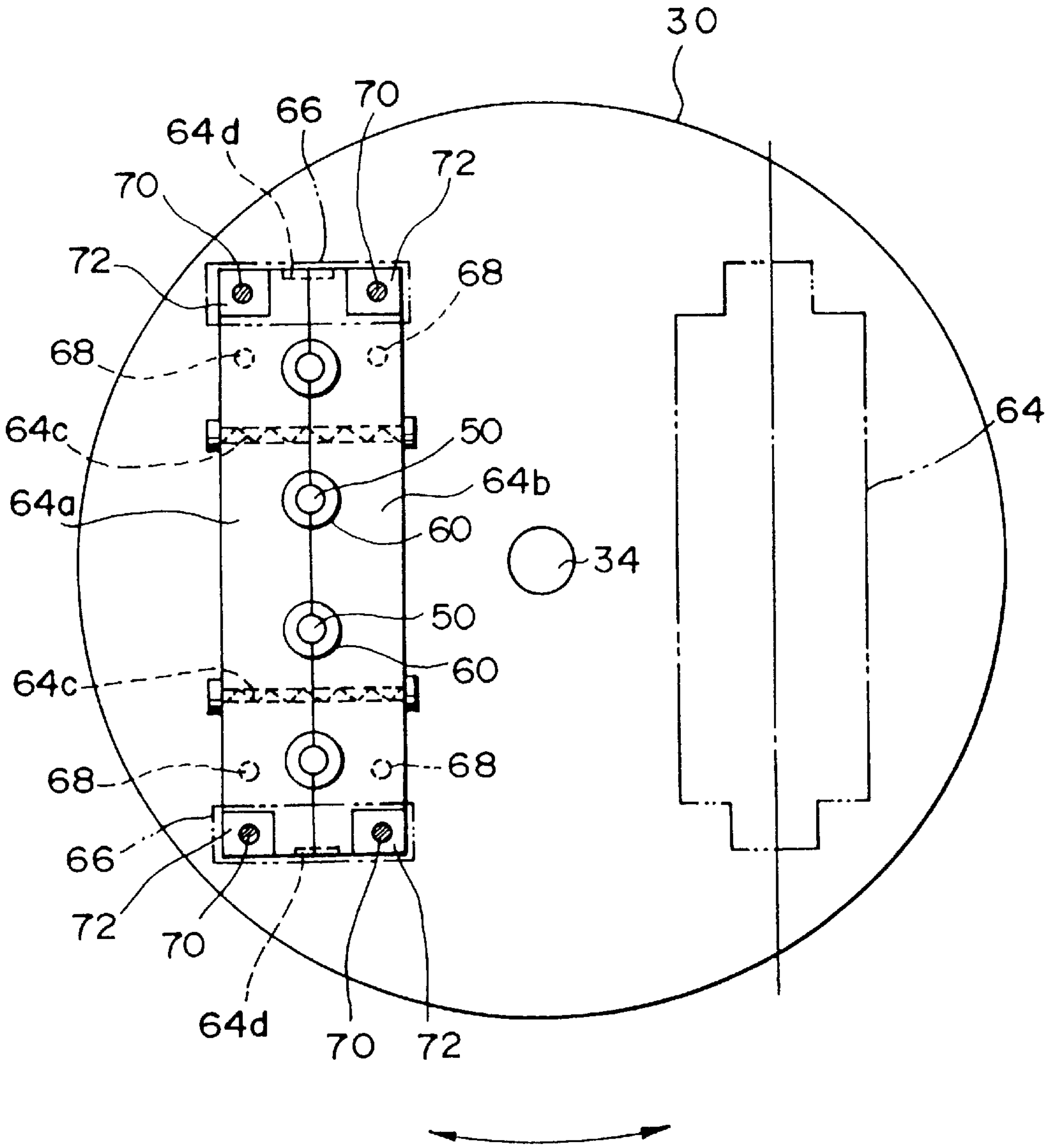
FIG. 5 is an underside view of a rotary disc.
Figure 7:
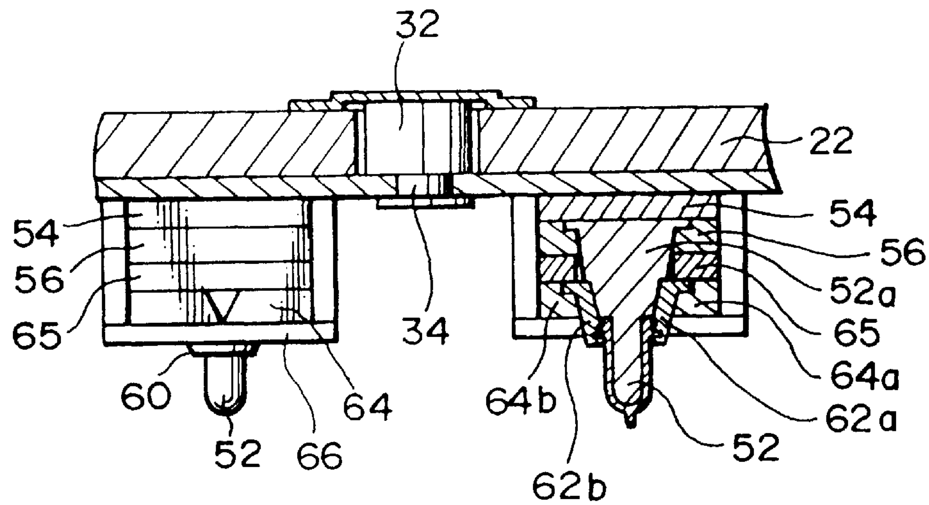
FIG. 7 is a partially sectional view showing the injection core mold and a neck cavity mold mounted on the rotary disc.

As shown in FIG. 2 to FIG. 4, the rotary disc 30 constituting the first circulatory carrier is rotatably mounted at the underside of the upper clamping plate 22. As shown in FIG. 7, this rotary disc 30 is fixed to a rotational shaft 34 rotationally driven by a rotary actuator 32 fixed to the upper clamping plate 22. As shown in FIG. 5, which is an underside view of the rotary disc 30, the two injection core molds 50 and the two neck cavity molds 60 are mounted on the rotary disc 30 in positions corresponding to the injection molding section 14 and the preform ejecting section 16. The details of the injection core molds 50 and the neck cavity molds 60 will be discussed in detail later.

As shown in FIG. 2 and FIG. 4, the injection molding section 14 is provided with a hot runner mold 40 with which a nozzle of the injecting apparatus 12 nozzle-touches, and the injection cavity mold 42 is mounted on this hot runner mold 40. This injection cavity mold 42 has a cavity for each of the N preforms 1 simultaneously molded in the injection molding section 14, for example four cavities. This injection cavity mold 42 is capable of cooling the injection molded preforms, and a coolant, for example water at room temperature, is circulated therethrough.

As shown in FIG. 4 to FIG. 8, the two injection core molds 50 mounted on the rotary disc 30 each have the same number of core pins 52 as the number N of preforms simultaneously molded, for example four core pins 52. As shown in FIG. 7, the base portions 52*a* of these core pins 52 are supported by a core presser plate 54 fixed to the underside of the rotary disc 30 and a core fixing plate 56 fixed to the underside of this core presser plate 54. When the clamping cylinder 28 is driven and the clamping rod 28*a* drives down the upper clamping plate 22, the core pins 52 of the injection core mold 50 are driven down integrally with the rotary disc 30, the core presser plate 54 and the core fixing plate 56 mounted on this upper clamping plate 22 and are thereby clamped onto the injection cavity mold 42.

Figure 11:
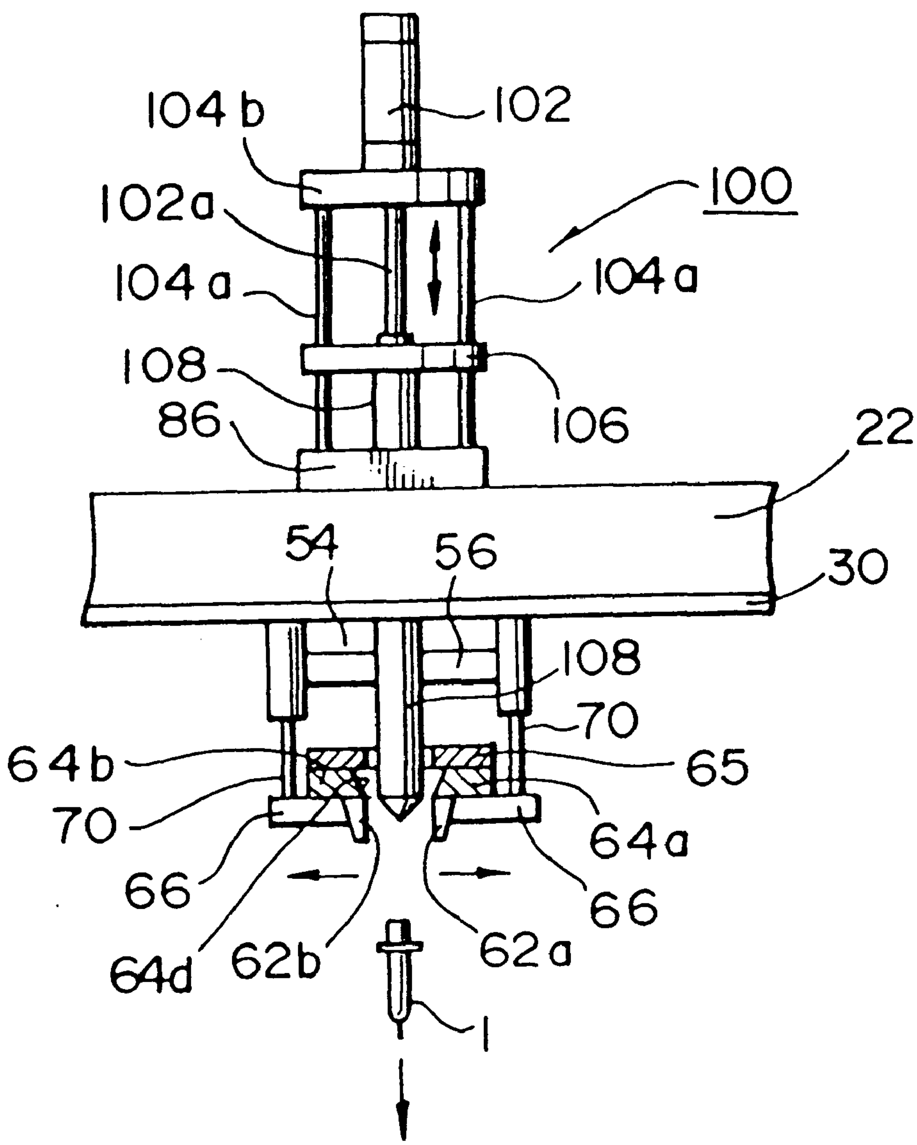
FIG. 11 is a partially sectional view illustrating a preform 1 ejecting operation.

As shown in FIG. 7 and FIG. 11, the two neck cavity molds 60 mounted on the rotary disc 30 are made up of pairs of split molds 62*a* and 62*b*, each neck cavity mold 60 comprising the same number of pairs of split molds 62*a* and 62*b* as the number N of preforms simultaneously molded, for example four. The pairs of split molds 62*a* and 62*b* of each neck cavity mold 60 are fixed by split plates 64*a* and 64*b*, and these split plates 64*a* and 64*b* constitute a neck fixing plate 64. As shown in FIG. 11, a neck presser plate 65 which pushes this neck fixing plate 64 downward is disposed on the upper surface side of the split plates 64*a* and 64*b*. Also, there are provided guide plates 66 which support the undersides of the ends of the neck fixing plate 64. The split plates 64*a* and 64*b* are kept normally closed by springs 64*c* shown in FIG. 5. As shown in FIG. 5, a wedge hole 64*d* is provided at each end of the split plates 64*a* and 64*b*. After the neck fixing plate 64 has been carried into the preform ejecting section 16, the split plates 64*a* and 64*b* are opened by being driven apart along the guide plates 66 by split plate opening cams 108, which will be further discussed later, driven into the wedge holes 64*d*.

Figure 6:
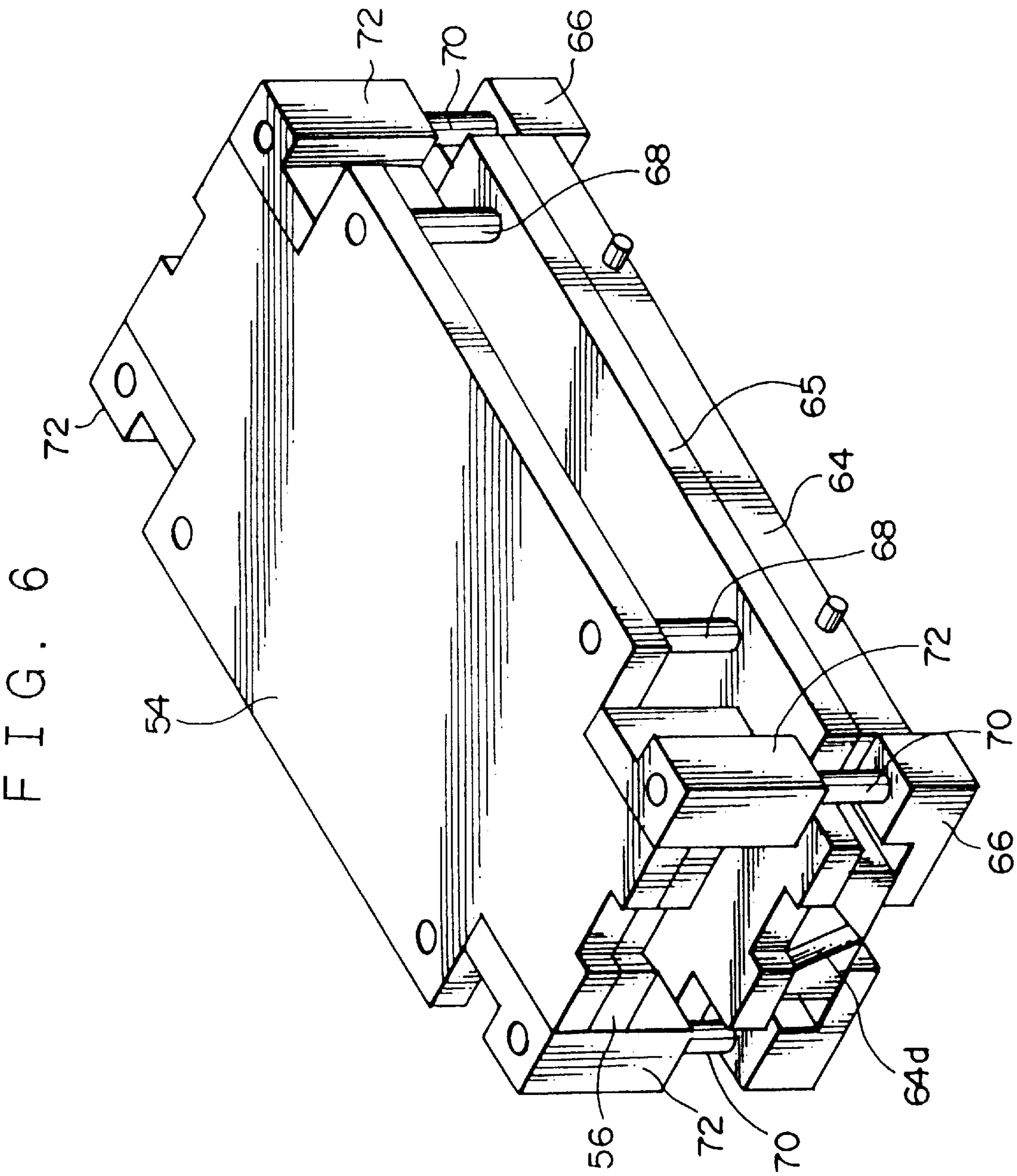
FIG. 6 is a perspective view showing the mold-released state of an injection core mold when a neck presser plate has been lowered.
Figure 8:
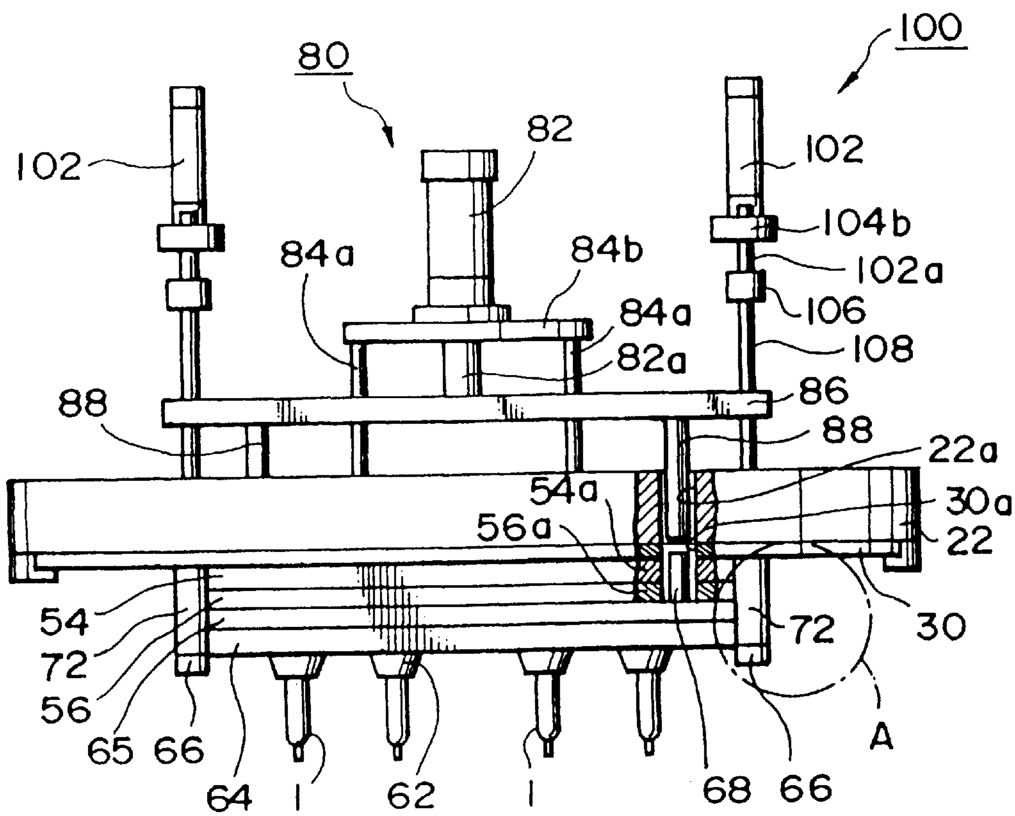
FIG. 8 is a view illustrating a preform ejecting drive mechanism.
Figure 9:
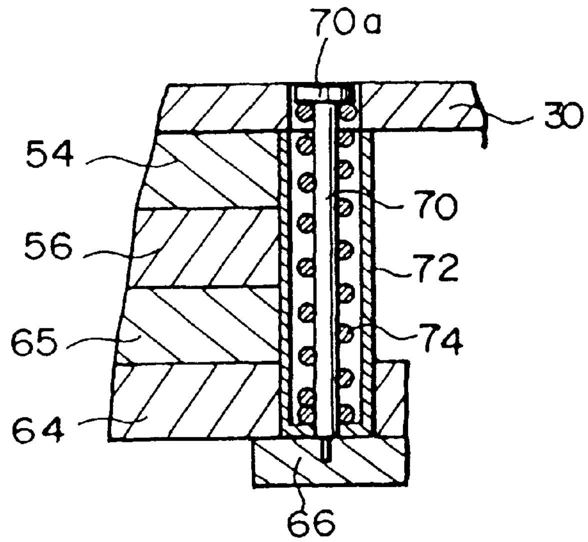
FIG. 9 is an enlarged sectional view of portion A in FIG. 8.

As shown in FIG. 9, which is an enlarged sectional view of portion A of FIG. 8, and in FIG. 6, at each end of each guide plate 66 a vertical lifting and lowering pin 70 has its lower end fixed in the guide plate 66, and a flange 70*a* is formed at the upper end of this lifting and lowering pin 70. A guide cylinder 72 extends downward from the underside of the rotary disc 30, and the lifting and lowering pin 70 is disposed inside this guide cylinder 72. A return spring 74 is disposed between the inner wall of the bottom portion of the guide cylinder 72 and the flange 70*a* of the lifting and lowering pin 70. The upward urging force of these return springs 74 urges the guide plate 66 upward at all times, and as a result the neck presser plate 65 is normally in contact with the underside of the core fixing plate 56.

By this state of contact between the core fixing plate 56 and the neck presser plate 65 being maintained, the injection core mold 50 and the neck cavity mold 60 are kept clamped together. When in the preform ejecting section 16 an external force (which will be further discussed later) is applied to the lifting and lowering pins 70, the lifting and lowering pins 70 descend against the urging force of the return springs 74 and the neck presser plate 65 is driven down so that it moves away from the underside of the core fixing plate 56 and pushes the neck fixing plate 64 downward. As a result, the core pins 52 of the injection core mold 50 are released from the preforms 1 whose neck portions 2 are held by the neck cavity mold 60.

Preform Ejecting Section 16

Next, the construction of the preform ejecting section 16, and in particular the preform ejection drive mechanism will be described. In this preferred embodiment, the preform ejection drive mechanism is made up of a neck mold-release driver 80 and a split mold opening driver 100. As shown in FIG. 8, the neck mold-release driver 80 has a first cylinder 82, and this first cylinder 82 is mounted on a first cylinder mounting plate 84*b* supported on the upper clamping plate 22 by way of first support rods 84*a*. The first cylinder 82 drives a first raising and lowering plate 86 up and down by way of a first piston rod 82*a*. Presser drive rods 88 are provided at each end of this first raising and lowering plate 86. Holes 22*a* are provided in the upper clamping plate 22 passing through from the upper surface to the lower surface thereof, and the presser drive rods 88 are disposed in these holes 22*a*. The initial position of the first raising and lowering plate 86 is a position such that the ends of the presser drive rods 88 do not project below the underside of the upper clamping plate 22 so they do not obstruct the rotation of the rotary disc 30.

As shown in FIG. 8, the rotary disc 30, the core presser plate 54 and the core fixing plate 56 respectively have holes 30*a*, 54*a* and 56*a* in positions facing the holes 22*a* in the upper clamping plate 22. Driven rods 68 disposed in the holes 30*a*, 54*a* and 56*a* are mounted on the upper surface of the neck presser plate 65.

Figure 10:
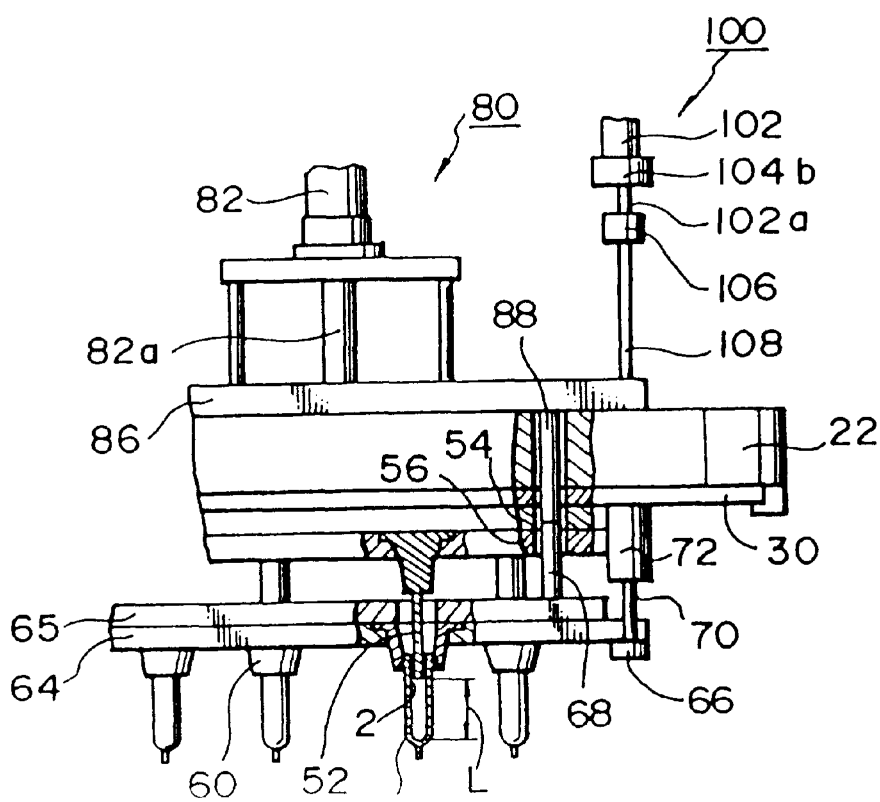
FIG. 10 is a partially sectional view illustrating the mold-released state of the injection core mold.

As a result, when the first cylinder 82 is driven, the neck presser plate 65 and the neck fixing plate 64 are driven down against the urging force of the return springs 74 by the first cylinder 82 by way of the first piston rod 82*a*, the presser drive rods 88 and the driven rods 68. As shown in FIG. 10, this causes the core pins 52 of the injection core mold 50 to release from the preforms 1 whose neck portions 2 are held by the neck cavity mold 60. In this preferred embodiment, the core pins 52 of the injection core mold 50 do not have to be pulled completely clear of the open ends of the preforms 1, it only being necessary that at least gaps through which air can enter form between the core pins 52 and the inner walls of the preforms 1. In this preferred embodiment, the downward stroke of the neck fixing plate 64, that is the releasing stroke of the core pins 52 (the length L shown in FIG. 10), is set at for example 50 mm.

Next, the split mold opening driver 100 will be described. As shown in FIG. 1 and FIG. 8, this split mold opening driver 100 has for example two second cylinders 102. These second cylinders 102, as shown in FIG. 11, are mounted on a second cylinder mounting plate 104*b* supported on the first raising and lowering plate 86 by way of second support rods 104*a*. As a result, when the first raising and lowering plate 86 is driven up or down by the first cylinder 82, the second cylinders 102 are also moved up or down at the same time. These second cylinders 102 drive second raising and lowering plates 106 up and down by way of second piston rods 102*a*. The split plate opening cams 108 are mounted on these second raising and lowering plates 106. The lower end portions of these split plate opening cams 108 are of a wedge shape fitting the wedge holes 64*d* formed in the split plates 64*a* and 64*b* constituting the neck fixing plate 64. By driving the second cylinders 102 the split plate opening cams 108 are driven down and the wedge portions at their ends are thereby inserted into the wedge holes 64*d* in the neck fixing plate 64, and this opens the split plates 64*a* and 64*b*. Consequently the pairs of split molds 62*a* and 62*b* mounted on this pair of split plates 64*a* and 64*b* are opened, and the preforms 1 are ejected from the neck cavity mold 60. In this preferred embodiment the drive timing of the second cylinders 102 is set to after the first cylinder 82 is driven.

Next, the operation of the preform molding station 10 of the apparatus of the preferred embodiment will be described.

Injection Molding in Injection Molding Section 14

The clamping cylinder 28 is driven and the upper clamping plate 22 is thereby driven down, whereby the injection core mold 50 and the neck cavity mold 60 are clamped to the injection cavity mold 42. After the clamped state shown in FIG. 4 is reached, by a screw inside the injecting apparatus 12 being advanced and rotated, the preforms 1 injection molding material, for example polyethylene terephthalate (PET), is injected by way of the hot runner mold 40 into the cavity bounded by the molds 42, 50 and 60, and the preforms 1 are thereby injection molded.

Cooling Step in Injection Molding Section 14

The injection cavity mold 42, the injection core mold 50 and the neck cavity mold 60 each have a coolant, for example water at room temperature, circulating through them, and the resin injected into the cavity bounded by the molds can be immediately cooled.

Injection Cavity Mold 42 Mold-Release Step in Injection Molding Section 14

By the clamping cylinder 28 being so driven that it lifts the upper clamping plate 22, the injection core mold 50 and the neck cavity mold 60 can be lifted up away from the injection cavity mold 42 as shown by the mold-open state of FIG. 10. At this time, because the neck portions 2 of the preforms 1 form an undercut with respect to the mold-release direction, the injection molded preforms 1 are held on the injection core mold 50 and neck cavity mold 60 side and are released from the injection cavity mold 42.

The timing at which this mold-release starts in the injection molding section 14 can be made considerably earlier than a conventional mold-release starting timing. In other words, the cooling time of the preforms 1 in the injection molding section 14 can be shortened. This is because even after the preforms 1 have been released from the injection cavity mold 42 the core pins 52 of the injection core mold 50 remain inside the preforms 1 and deformation of the preforms 1 accompanying their thermal contraction can be prevented. Therefore, the mold-release temperature of the preforms 1 in the injection molding section 14 only has to be low enough for a skin layer thick enough for the shape of the preforms 1 to be maintained after they are released from the injection cavity mold 42 to form at the outer surfaces of the preforms 1, and can be higher than conventional mold-release temperatures. Even if the mold-release temperature is high like this, because the cooling causes the preforms 1 to contract around the core pins 52 of the injection core mold 50, mold-release from the injection cavity mold 42 can be carried out relatively smoothly, and preform 1 mold-release problems do not occur. Also, because in the injection molding section 14 withdrawal of the core pins 52 is not carried out, even if the preforms 1 are mold-released at a high mold-release temperature, the mold-release problem of the lower ends of the preforms 1 being lifted together with the core pins 52 does not occur.

The clamped state of the injection core mold 50 and the neck cavity mold 60 with respect to the preforms 1 released from the injection cavity mold 42 is maintained by the core fixing plate 56 and the neck presser plate 65 being kept in contact with each other by the return springs 74. This clamped state of the injection core mold 50 and the neck cavity mold 60 is maintained through the subsequent preforms 1 carrying step and until in the preform ejecting section 16 the injection core mold 50 is released from the preforms 1. Cooling of the preforms 1 is possible throughout the time during which this clamped state of the injection core mold 50 and the neck cavity mold 60 is maintained.

Preforms 1 Carrying Step

The preforms 1 are carried from the injection molding section 14 to the preform ejecting section 16 by the rotary actuator 32 being driven and the rotary disc 30 constituting the first circulatory carrier being rotated thereby through 180°. During this preforms 1 carrying step, it is possible for cooling of the preforms 1 by the coolant circulating through the injection core mold 50 and the neck cavity mold 60 to continue without interruption.

Generally, when the preforms 1 are mold-released at a high temperature, crystallization occurs due to inadequate cooling and the wall surfaces of the preforms 1 become nontransparent, and particularly when PET is being used to make transparent containers this is a fatal defect. According to experiments carried out by the present inventors, this crystallization and loss of transparency of the preforms 1 accompanying inadequate cooling is particularly marked at the inner wall sides of the preforms 1. This is because at the inner wall side of a preform 1 there is less surface area in contact with the mold and consequently the inner wall is more liable to be inadequately cooled than the outer wall. Also, when as in the past the injection cavity mold 42 and the injection core mold 50 are released from the preforms 1 in the injection molding section, the inner wall side is more liable to be inadequately cooled than the outer wall because the heat-radiating surface area at the inner wall side of the preform 1 is smaller than at the outer wall side and furthermore heat is confined in the interior of the preform 1.

In this preferred embodiment, even if in the injection molding portion 14 the preforms 1 are mold-released at a relatively high temperature, in the subsequent carrying step it is possible for the preforms 1 to continue to be cooled by the injection core mold 50 and the neck cavity mold 60. In particular, because the inner walls of the preforms 1 can be uninterruptedly cooled by the core pins 52 of the injection core mold 50, crystallization and loss of transparency caused by inadequate cooling can be certainly prevented. Also, the neck portions 2, which because they are thick have large heat capacities and are more liable to crystallize than other portions, can be cooled by the neck cavity mold 60 and prevented from crystallizing.

Preform Cooling Step in Preform Ejecting Section 16

Even after the preforms 1 have been carried into the preform ejecting section 16, by the clamped state of the injection core mold 50 and the neck cavity mold 60 with respect to the preforms 1 being maintained, the preforms 1 can be cooled as they were during the above-mentioned carrying step. At this time, even if in the injection molding section 14 the clamping cylinder 28 has been driven and the upper clamping plate 22 lowered for the injection molding of the next preforms, because the above-mentioned clamped state in the preform ejecting section 16 is maintained, cooling of the preforms 1 can be continued.

Separation of Neck Cavity Mold 60 from Injection Core Mold 50

Cooling of the preforms 1 by the core pins 52 of the injection core mold 50 only has to continue long enough for crystallization caused by inadequate cooling of the inner walls of the preforms 1 to be prevented and for deformation of the ejected preforms 1 to be avoided, and indeed if the preforms 1 are excessively cooled by the core pins 52, removal of the core pins 52 becomes difficult. Therefore, in this preform ejecting section 16, first the injection core mold 50 is released from the preforms 1. In this preferred embodiment, this is achieved by the neck cavity mold 60 holding the preforms 1 being released from the injection core mold 50.

This separation of the neck cavity mold 60 is carried out by the neck presser plate 65 kept in contact with the core fixing plate 56 by the urging force of the return springs 74 being lowered by the neck mold-release driver 80. When the first cylinder 82 of the neck mold-release driver 80 is driven, the pushing force thereof transmitted through the first piston rod 82*a,* the first raising and lowering plate 86, the presser drive rods 88 and the driven rods 68 causes the neck fixing plate 64 to be pressed against the neck presser plate 65 and be driven downward as shown in FIG. 6 and FIG. 10. At this time, because the preforms 1 have their neck portions 2 held by the neck cavity mold 60, the preforms 1 are also driven downward together with the neck fixing plate 64 and the neck cavity mold 60. Consequently, the separation of the neck cavity mold 60 from the injection core mold 50 results in the injection core mold 50 being released from the preforms 1.

This mold-releasing stroke of the injection core mold 50 with respect to the preforms 1 does not have to be so long that the core pins 52 are pulled completely clear of the open ends of the preforms 1 for the subsequent carrying of the preforms 1 as it does conventionally, and need only be long enough for at least gaps through which air can enter to be formed between the inner walls of the preforms 1 and the core pins 52. Consequently, the mold-releasing stroke of the injection core mold 50 depends on the angle of the removal taper provided on the core pins 52 and the inner walls of the preforms 1, and the greater this removal taper angle is, the shorter the mold-release stroke need be. Because the mold-releasing stroke of the injection core mold 50 can be shortened in this way the installation height of the first cylinder 82 can be made low and the overall height of the injection molding apparatus can be made low, and this is advantageous in the transportation and installation of the apparatus.

Preforms 1 Ejection Step in Preform Ejecting Section 16

Because the preforms 1 have their neck portions 2 held by the neck cavity mold 60 comprising the pairs of split molds 62*a* and 62*b,* the preforms 1 can be ejected by this neck cavity mold 60 being released. To bring this about, the second cylinders 102 of the split mold opening driver 100 are driven. This driving force of the second cylinders 102 is transmitted to the split plate opening cams 108 by way of the second piston rods 102*a* and the second raising and lowering plates 106. By the split plate opening cams 108 being driven downward, as shown in FIG. 11 their ends are inserted into the wedge holes 64*d* formed in the split plates 64*a* and 64*b,* these split plates 64*a* and 64*b* are driven open, and the pairs of split molds 62*a* and 62*b* are thereby opened. At this time, even if a neck portion 2 of a preform 1 has stuck to one of the split molds 62*a,* 62*b* and tries to move therewith, because the respective core pin 52 of the injection core mold 50 is still inside the preform 1, lateral movement of the preform 1 is restricted and the preform 1 can be dropped downward without fail.

In the state before the split plate opening cams 108 are driven downward, in order to avoid the split plate opening cams 108 interfering with the rotation of the rotary disc 30 it is necessary that their ends stop within the thickness of the upper clamping plate 22. On the other hand, because the neck fixing plate 64 which is driven open by these split plate opening cams 108 is in the farthest position from the rotary disc 30, the downward stroke of the split plate opening cams 108 is long. In this preferred embodiment, because the second cylinders 102 which drive these split plate opening cams 108 are mounted on the first raising and lowering plate 86 driven by the first cylinder 82 and because before the split plate opening cams 108 are driven the first raising and lowering plate 86 is driven, the actual downward stroke through which the split plate opening cams 108 are driven by the second cylinders 102 is short. As a result, the installation height of the second cylinders 102 can be made low, the overall height of the injection molding apparatus an be made low, and an apparatus advantageous from the points of view of transportation and installation can be provided.

After this preform 1 ejecting step is finished, the first and second cylinders 82 and 102 return to their original states. As a result, the neck presser plate 65 is brought back into contact with the core fixing plate 56 by the return springs 74, and the injection core mold 50 and the neck cavity mold 60 are returned to their clamped state in preparation for the next injection molding.

The cooling and mold-releasing steps described above carried out in the preform ejecting section 16 only have to be finished within the time taken for the injection molding of the next, new preforms in the injection molding section 14 to finish, in other words within the injection molding cycle time. The preform 1 cooling time depends particularly on the thickness of the trunk portions of the preforms 1, and the thicker the preforms 1 are the longer the cooling time that must be provided. In this preferred embodiment this cooling time can be adjusted by way of the setting of the timing of the mold-release of the injection core mold 50 in the preform ejecting section 16 as well as by adjusting the cooling time in the injection molding section 14. As a result, even while the mold-release temperature in the injection molding section 14 is made high and the injection molding cycle time thereby shortened, because adjustment of the cooling time is easy a highly flexible preform injection molding station can be provided.

After the preform 1 injection molding in the injection molding section 14 is finished, the injection core molds 50 and the neck cavity molds 60 in the two sections 14 and 16 are changed around by the rotary disc 30 being rotated through 180° by the rotary actuator 32. In this preferred embodiment, the rotary actuator 32 consists of reversible rotary carrying means of which the rotary carrying direction reverses each time. As a result, even if the injection core molds 50 and the neck cavity molds 60 rotationally carried have cooling pipes for circulating coolant therethrough connected thereto, these cooling pipes will not be twisted through more than one revolution. Consequently, it is possible to connect these cooling pipes to the molds without using rotary connectors and their construction does not become complicated.

Because for the reasons discussed above the preforms 1 are given a uniform temperature or a suitable temperature distribution, it is possible to mold bottles of a desired thickness. Also, because whitening crystallization of the bottles is prevented, highly transparent bottles can be molded. This invention is not limited to being applied to the hot parison blow molding described above, and of course can also be applied to so-called cold parison blow molding wherein the preforms are returned to room temperature before being heated again and blow molded. In this case also, there is the effect that the injection molding cycle time can be shortened.

Transfer Station 200

Figure 21:
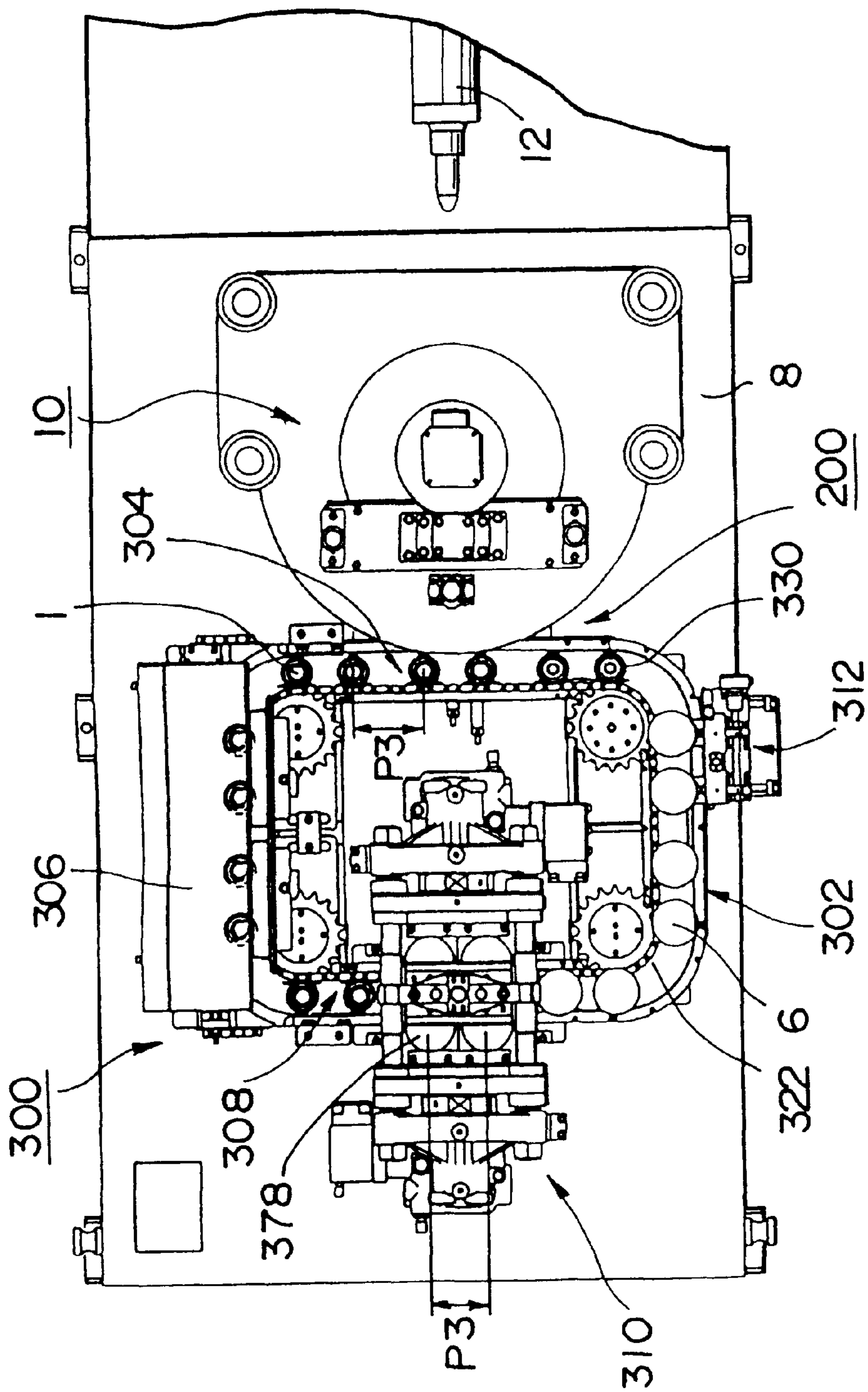
FIG. 21 is a plan view showing another preferred embodiment apparatus of the invention wherein the numbers of preforms molded simultaneously are different from those of the apparatus of FIG. 1.

Next, the constitution and operation of the transfer station 200 will be described with reference to FIG. 2, FIG. 12 to FIG. 14 and FIG. 21 and FIG. 22. FIG. 12 to FIG. 15 show a mechanism corresponding not to the preferred embodiment apparatus shown in FIG. 1 but rather corresponding to a preferred embodiment apparatus shown in FIG. 21. FIG. 21 shows a case wherein the above-mentioned numbers N and n of preforms molded simultaneously are respectively N=6 and n=2, and accordingly the mechanisms of the transfer station 200 shown in FIG. 12 to FIG. 15 transfer n=2 preforms 1 simultaneously. The case wherein n=1 preform 1 is transferred at a time is exactly the same as the case where n=2 except in that there is no transfer pitch conversion, which will be further discussed later.

This transfer station 200 has a receiving and lowering mechanism 210 which receives and lowers preforms 1 ejected from the preform ejecting section 16 of the preform molding station 10, and an inverting and handing over mechanism 230 which then turns the preforms 1 upside-down and hands them over to the preform receiving section 304 of the blow molding station 300.

Receiving and Lowering Mechanism 210

Figure 12:
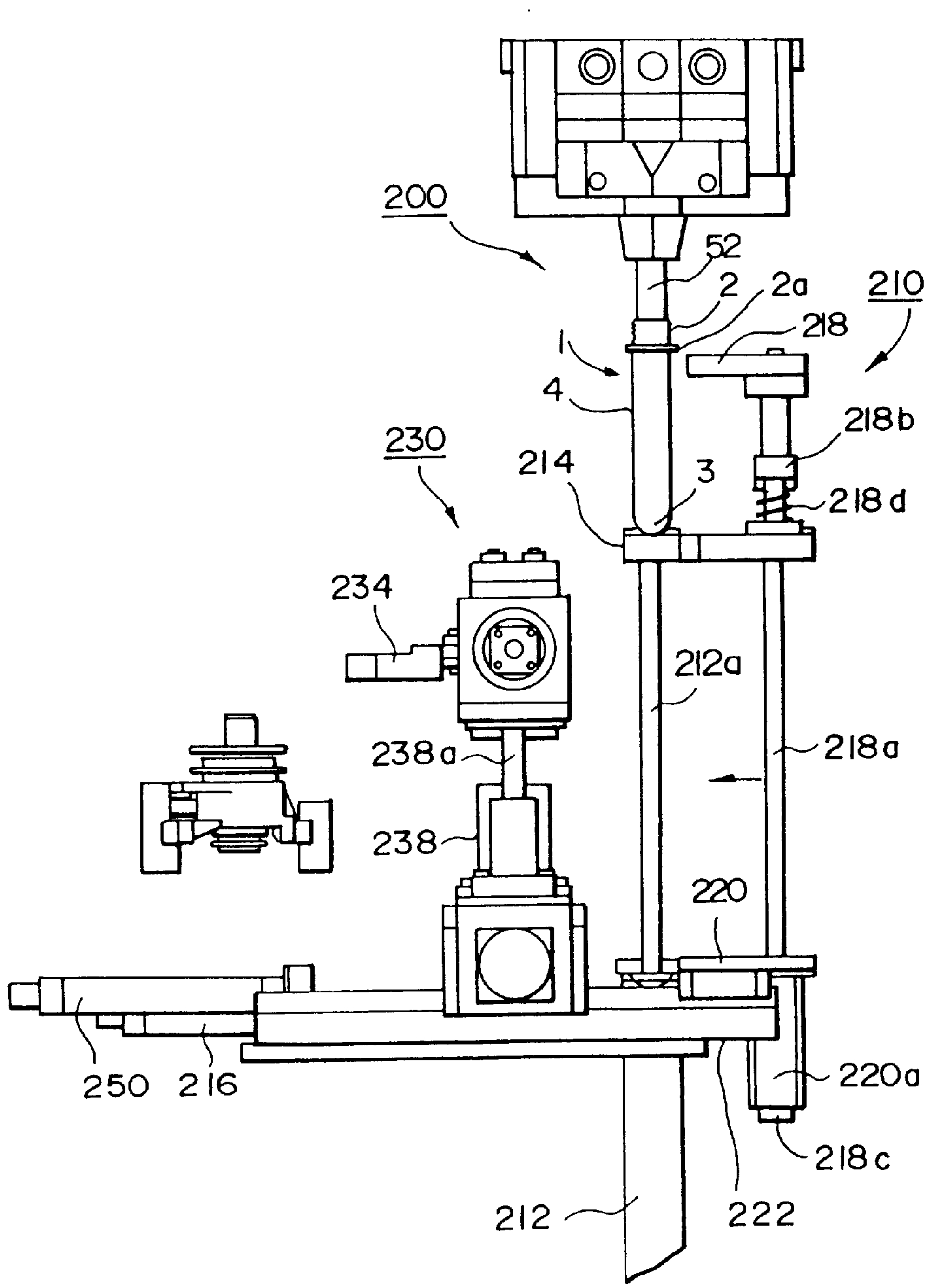
FIG. 12 is a view illustrating the operation of a transfer station receiving a preform.
Figure 13:
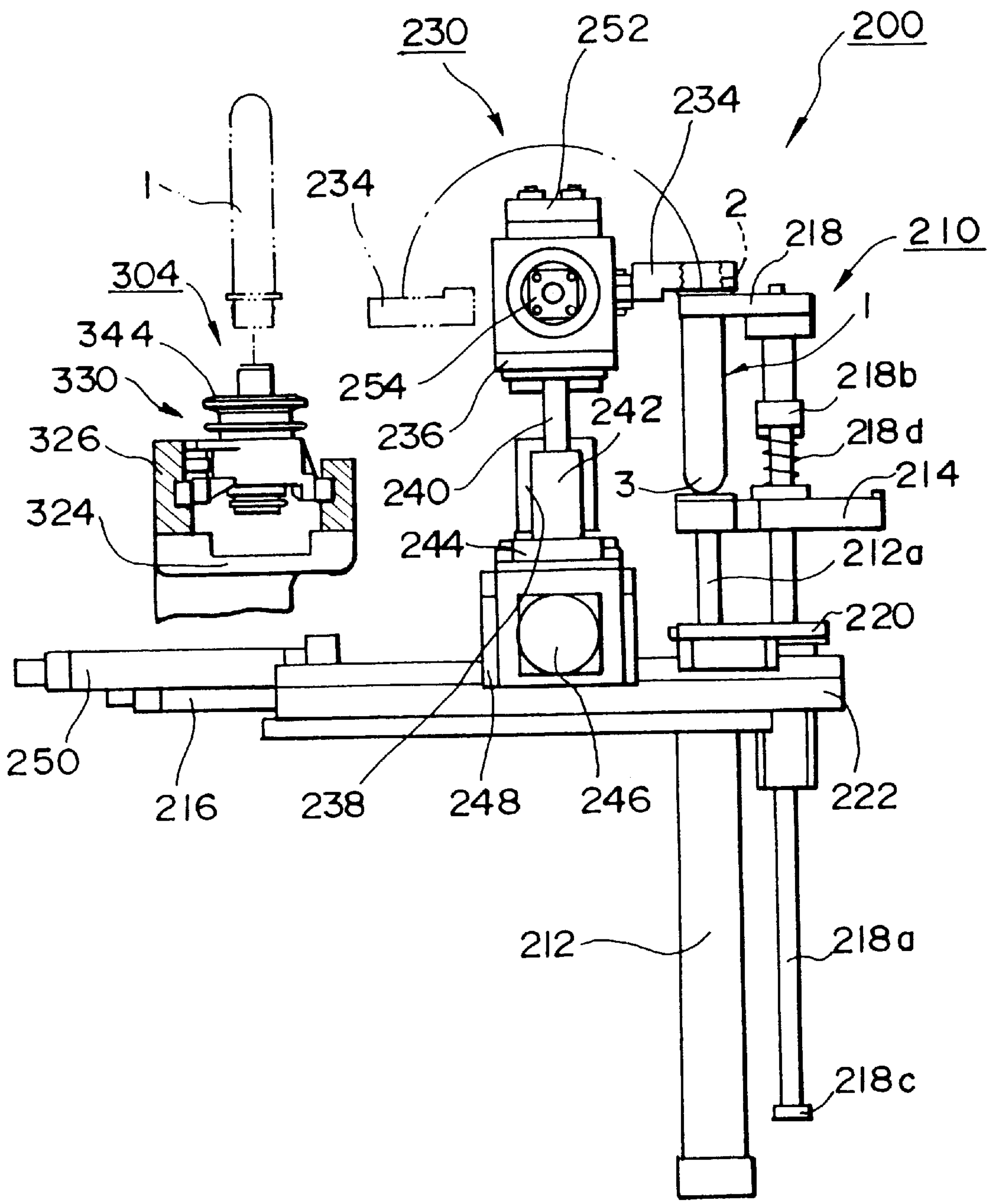
FIG. 13 is a view illustrating the operation of a transfer station handing a preform over to a blow molding station.

FIG. 12 and FIG. 13 respectively show the receiving and lowering mechanism 210 in a raised position and a lowered position. This receiving and lowering mechanism 210 has a bottom portion holding part 214 which holds the bottom portion 3 of a preform 1 and a neck lower portion holding part 218 which supports a support ring 2*a* formed at the lower end of the neck portion 2 of the preform 1. The bottom portion holding part 214 is mounted on a rod 212*a* of a first raising and lowering drive device 212 comprising an air cylinder or the like and is movable up and down between the raised position in which it is shown in FIG. 12 and the lowered position in which it is shown in FIG. 13. This vertical stroke b is shown in FIG. 4.

The neck lower portion holding part 218 is movable up and down together with the bottom portion holding part 214 and is movable horizontally through a horizontal stroke a shown in FIG. 4. To make this possible, a first slider 220 is disposed on a rail 222 slidably therealong. This first slider 220 is driven horizontally by a rod 216*a* of a first advancing and withdrawing drive device 216 comprising an air cylinder or the like. The neck lower portion holding part 218 has a small diameter shaft portion 218*a* at its lower part and a large diameter shaft portion 218*b* at its upper part, and the small diameter shaft portion 218*a* passes through a stopper member 220*a* mounted on the first slider 220. A flange 218*c* is fixed to the lower end of the small diameter shaft portion 218*a* which projects below this stopper member 220*a*. Also, a spring 218*d* is disposed around a portion of the small diameter shaft portion 218*a* projecting upward of the bottom portion holding part 214. Because this spring 218*d* is disposed between the bottom portion holding part 214 and the large diameter shaft portion 218*b*, the large diameter shaft portion 218*b* is pushed upward by the spring 218*d* as the bottom portion holding part 214 ascends, and the neck lower portion holding part 218 can thereby be raised. When the first advancing and withdrawing drive device 216 is driven, because this horizontal driving force is transmitted by way of the first slider 220 to the shaft portions 218*a* and 218*b*, the neck lower portion holding part 218 is caused to slide horizontally. This sliding stroke a is shown in FIG. 4.

The operation of this receiving and lowering mechanism 210 will now be explained with reference to FIG. 4, FIG. 12 and FIG. 13. Before the neck cavity mold 60 is driven open in the preform ejecting section 16 of the preform molding station 10, the bottom portion holding part 214 and the neck lower portion holding part 218 are disposed in the positions in which they are shown in FIG. 12. In this state shown in FIG. 12, the raised position of the neck lower portion holding part 218 is determined by the flange 218*c* thereof abutting with the stopper member 220*a*. The bottom portion holding part 214 is stopped in a position which it reaches by compressing the spring 218*d* after the neck lower portion holding part 218 has reached its upper limit position. At this time, the neck lower portion holding part 218 is in a position wherein it is withdrawn to the right in FIG. 4 and FIG. 12 of a position directly below the support ring 2*a* of the preform 1. When the neck cavity mold 60 is driven open, the preform 1 drops downward and its bottom portion 3 is caught by the bottom portion holding part 214. At this time, as shown in FIG. 12, the preform 1 does not completely release from the core pin 52 and the preform 1 maintains an upright state with a portion of the core pin 52 remaining inserted therein.

After that the first advancing and withdrawing drive device 216 is driven, and the neck lower portion holding part 218 is moved to the left through the stroke a (see FIG. 4). As a result, the neck lower portion holding part 218 is positioned directly below the support ring 2*a* of the preform 1.

After that, the first raising and lowering drive device 212 is so driven that it pulls in the rod 212*a*, and the bottom portion holding part 214 starts to be lowered. In the initial stage of this lowering, until the spring 218*d* returns to its original length, the neck lower portion holding part 218 stays in its upper position. As a result, during the initial stage of this lowering, the bottom portion holding part 214 moves away from the bottom portion 3 of the preform 1 and the support ring 2*a* of the preform 1 comes to rest on the neck lower portion holding part 218. The first raising and lowering drive device 212 continues to be driven after this, and the preform 1 descends with its support ring 2*a* being held by the neck lower portion holding part 218 only. It is preferable that members of low thermal conductivity, for example synthetic resin or the like, be used for the portions of the bottom portion holding part 214 and the neck lower portion holding part 218 which make contact with the preform 1. The preform 1 supported by the neck lower portion holding part 218 continues to be lowered until it reaches the position in which it is shown in FIG. 13.

Inverting and Handing Over Mechanism 230

Figure 14:
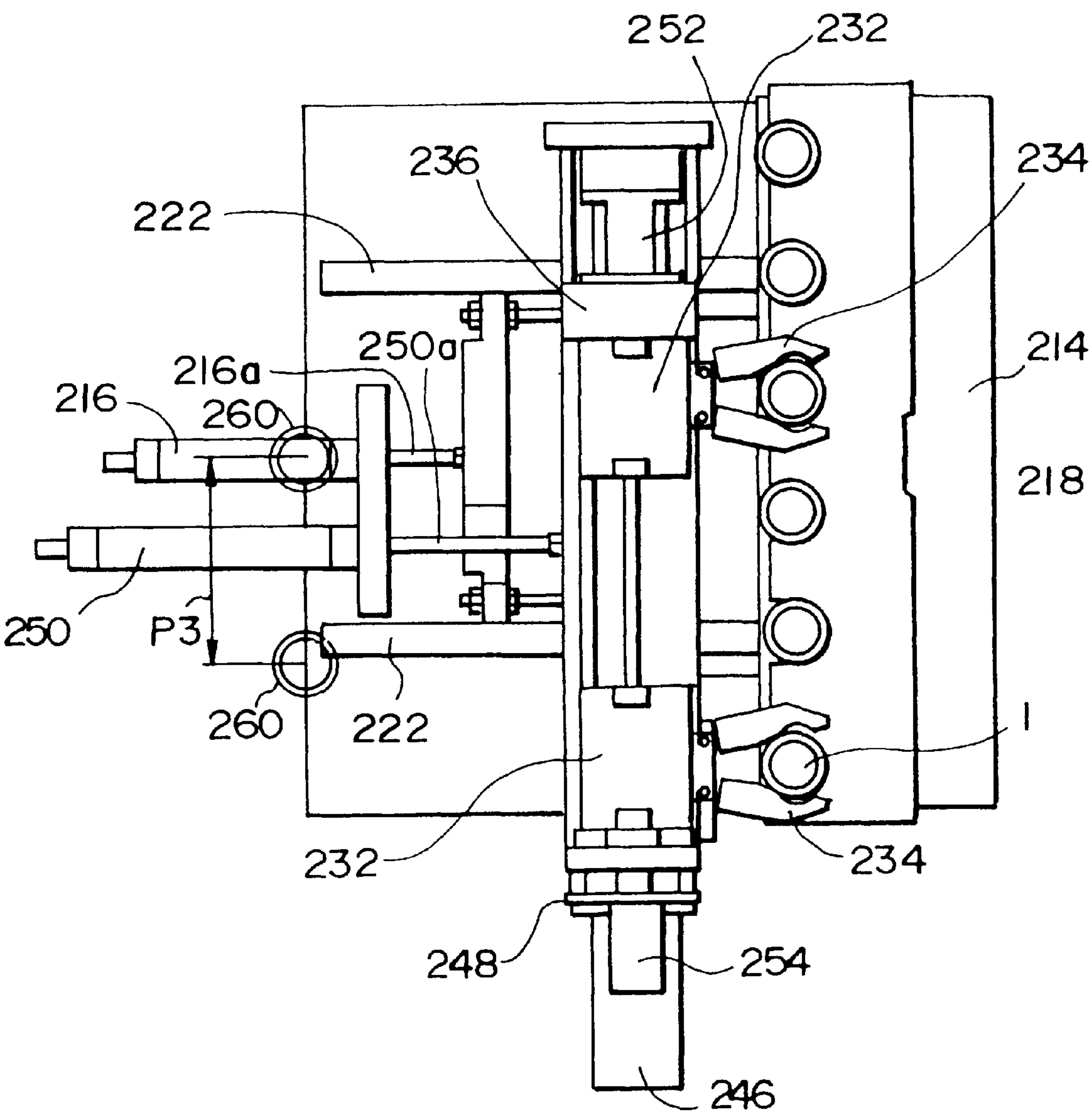
FIG. 14 is a plan view of the transfer station.
Figure 15:
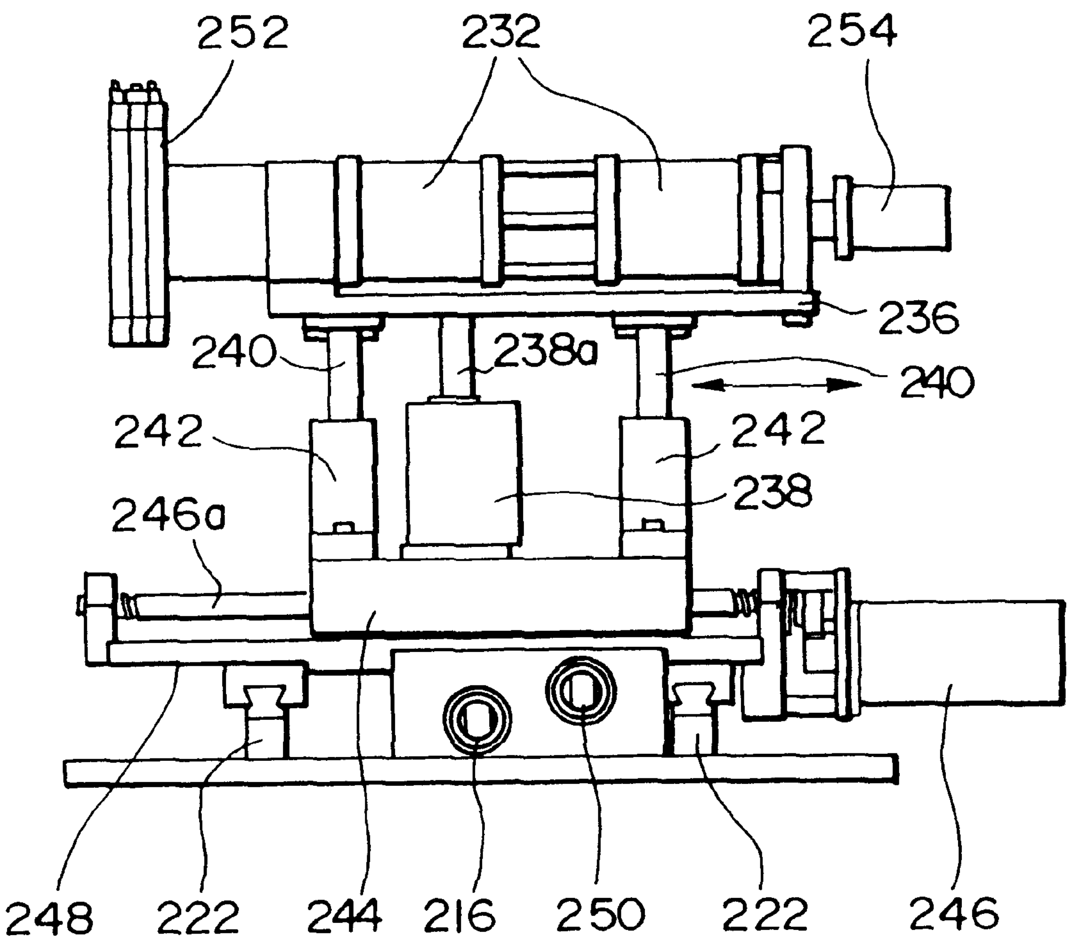
FIG. 15 is a side view of the transfer station.

Next, the constitution of the inverting and handing over mechanism 230 will be described with reference to FIG. 4 and FIG. 13 to FIG. 15. This inverting and handing over mechanism 230 has two neck holding mechanisms 232 corresponding to the number n=2 of preforms simultaneously blow molded in the blow molding section 310 shown in FIG. 21 (see FIG. 14). The neck holding mechanisms 232 each have an open/closeable pair of neck holding members 234 which hold the neck portion 2 of the preform 1. As shown in FIG. 15, these two neck holding mechanisms 232 are mounted on a support table 236, and this support table 236 is linked to a rod 238*a* of a second raising and lowering drive device 238 comprising and air cylinder or the like. As a result, the two neck holding mechanisms 232 are movable vertically through a vertical stroke e shown in FIG. 4. In order to make this vertical movement smooth, for example two guide rods 240 are provided and guided by guide portions 242.

The second raising and lowering drive device 238 and the guide portions 242 described above are mounted on a second slider 244 as shown in FIG. 15. This second slider 244 is provided with a horizontal drive device 246 which moves the second slider 244 in the direction in which the number of preforms N, for example 4, simultaneously molded in the injection molding section 14 are arrayed. This horizontal drive device 246 moves the second slider 244 horizontally by means of for example a ball screw 246*a*. The horizontal drive device 246 is mounted on a third slider 248, and this third slider 248 is provided with a second advancing and withdrawing drive device 250 which advances and withdraws the raising and lowering drive device 238 through the advancing and withdrawing stroke c shown in FIG. 4. That is, as shown in FIG. 14, a rod 250*a* of the second advancing and withdrawing drive device 250 is linked to the third slider 248.

Also, there is provided an inverting drive device 252 which rotates the two neck holding mechanisms 232 through 180° about a horizontal axis. The 180° rotational stroke d of this inverting drive device 252 is shown in FIG. 4. As a result of this inversion the preform 1 moves from an upright state wherein the neck portion 2 faces upward to an inverted state wherein the neck portion 2 faces downward.

Next, the operation of this inverting and handing over mechanism 230 will be explained. When the preforms 1 reach their lowered positions as shown in FIG. 13, the neck holding mechanisms 232 which are in a standby position shown with chain lines in FIG. 13 are rotated through 180° by the inverting drive device 252. Opening and closing drive mechanisms incorporated into the neck holding mechanisms 232 close the pairs of neck holding members 234, and the neck portions 2 of the preforms 1 are held by these neck holding members 234. Then the preforms 1 are inverted. Before that, however, to prevent the preforms 1 from interfering with other members, the neck lower portion holding part 218 is withdrawn to the right through the moving stroke a (see FIG. 4), and by the third slider 248 being moved to the left through the moving stroke c (see FIG. 4) the two neck holding mechanisms 232 are moved to the left. After that, by the preforms I being rotated through 180° by the inverting drive device 252, the preforms 1 reach the position shown with chain lines in FIG. 13. Then, by the two neck holding mechanisms 232 being lowered by the second raising and lowering drive device 238 through the stroke e (see FIG. 4), the preforms 1 can be placed on carrier members 330 positioned in the preform receiving section 304 of the blow molding station 300. After that, the neck holding mechanisms 232 are opened and moved through the vertical stroke e and the transverse stoke c shown in FIG. 4 whereby the neck holding mechanisms 232 are moved away from the preforms 1 and returned to their standby position shown with chain lines in FIG. 13.

When the above transfer operation is carried out in the preferred embodiment apparatus shown in FIG. 21 wherein the number of simultaneously blow molded preforms 1 is n=2, n=2 preforms 1 are transferred simultaneously. The transferred two preforms 1 are handed over to carrier members 330 in two receiving positions 260. At this time, the pitch P2 at which the neck holding mechanisms 232 receive the two preforms 1 from the receiving and lowering mechanism 210 is different from the pitch P3 at which the neck holding mechanisms 232 deliver the two preforms 1 to the carrier members 330. This is because during the transfer of the preforms 1 pitch conversion is performed by a pitch change drive device 254; this point will be further discussed later. In the case of the preferred embodiment apparatus of FIG. 1 wherein the number of preforms 1 simultaneously blow molded is n=1, the preform 1 is delivered to a carrier member 330 positioned between the two receiving positions shown in FIG. 14. Therefore, each time an injection molding operation in which N=4 simultaneously injection molded preforms 1 are injection molded is finished, transfer of one preform 1 at a time is repeated four times.

Blow Molding Station 300

Next, the blow molding station 300 will be described with reference to 41, FIG. 4 and FIG. 16 to FIG. 20.

Second Circulatory Carrier 302 and Preform Receiving Section 304

This blow molding station 300 circulates the carrier member 330 carried by the second circulatory carrier 302 in order through the preform receiving section 304, the heating section 306, the standby section 308, the blow molding section 310 and the bottle ejecting section 312. As shown in FIG. 1, the second circulatory carrier 302 has four sprockets 320*a* to 320*d*, and for example only the sprocket 320*a* is driven and the other sprockets 320*b* to 320*d* are not driven. An endless carrier chain 322 runs around these four sprockets 320*a* to 320*d*. Some other endless drive member, such as a belt, for example a V-belt or a toothed belt, can be used instead of the chain, and other rotary drive members such as pulleys can be used instead of the sprockets.

Figure 18:
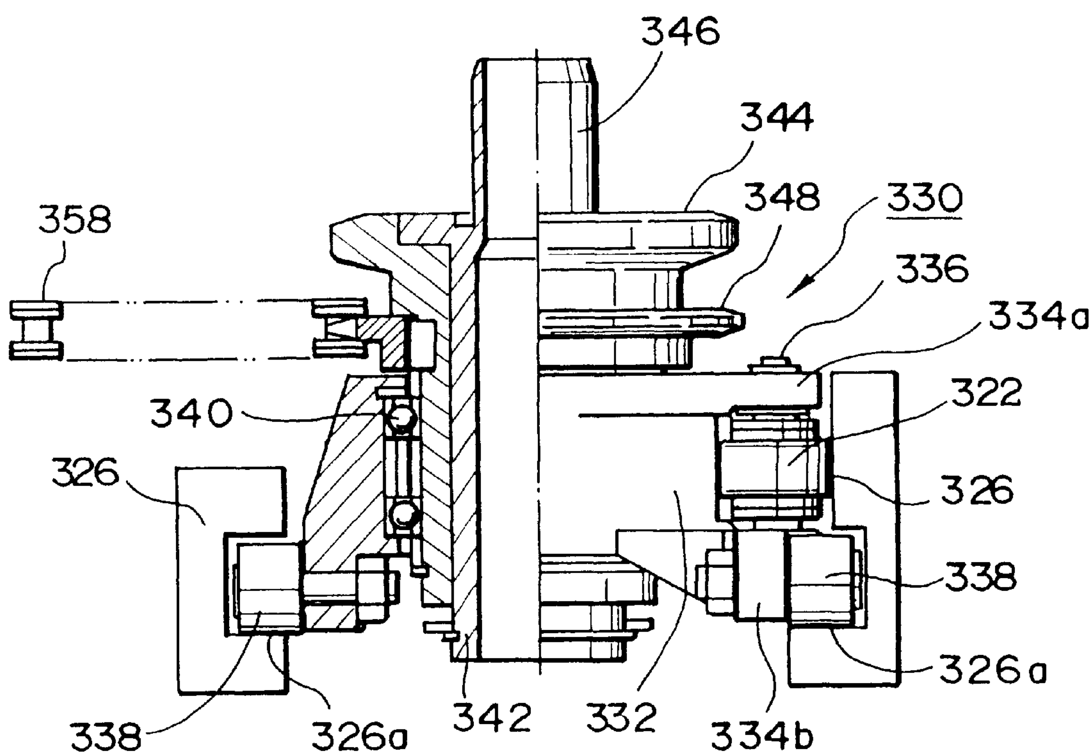
FIG. 18 is a partially cut-away front view of the carrier member shown in FIG. 16.

In the preferred embodiment apparatus shown in FIG. 1, ten carrier members 330 are fixed to the carrier chain 322. This fixing structure is as follows:

As shown in FIG. 18, each carrier member 330 has a cylindrical mount portion 332. This mount portion 332 has is provided at one side thereof with projecting portions 334*a* and 334*b* which respectively project above and below the carrier chain 322, sandwiching the carrier chain 322. Adjacent chain links in the carrier chain 322 are connected by hollow pins, and the upper and lower projecting portions 334*a* and 334*b* are linked to the carrier chain 322 by fixing pins 336 being passed through the central portions of the hollow pins and having their ends secured so that they cannot drop out.

A cylinder 342 is rotatably supported by way of a bearing 340 inside the cylindrical portion of the mount part 332. The upper portion of this cylinder 342 functions as a carrying surface 344 on which the end surface of the neck portion 2 of an inverted preform 1 is placed. Also, a carrying pin 346 is supported inside this cylinder 342. This carrying pin 346 has a portion thereof projecting upward of the carrying surface 344 which enters the neck portion 2 of the preform 1 and can support the preform 1 in its inverted state. Thus, the carrying surface 344 and the carrying pin 346 constitute a preform 1 supporting portion.

Figure 16:
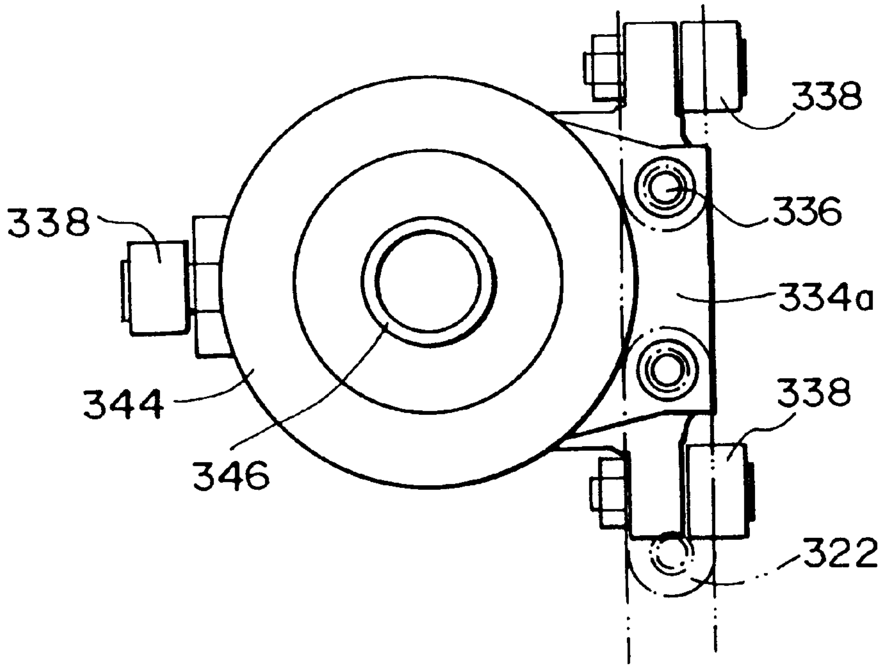
FIG. 16 is a plan view of a carrier member of a second circulatory carrier provided in the blow molding station.
Figure 17:
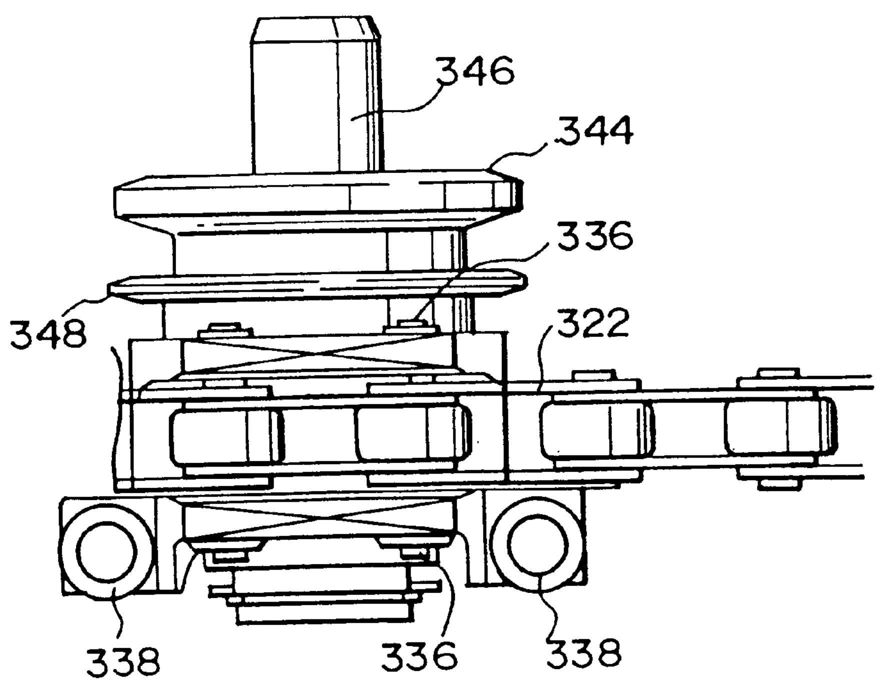
FIG. 17 is a side view of the carrier member shown in FIG. 16.

As shown in FIG. 16, three cam followers 338 consisting of rollers or the like are supported on this carrier member 330. Two of the cam followers 338 roll along the inner side locus described when the carrier member 330 is driven by the carrier chain 322. The other cam follower 338 rolls along the outer side locus. These three cam followers 338 are guided by a carrier base 324 or by rails 326, depending on where the carrier member 330 is in the blow molding station 300. As shown in FIG. 18, the two rails 326 are disposed on either side of the carrying path and each are formed with a C-shaped cross-section and have a cam surface 326*a*. These rails 326 have portions which so project that they cover the upper portions of the cam followers 338, and the cam followers 338 cannot leave the rails 326. These rails 326 are disposed in the blow molding section 310.

Figure 19:
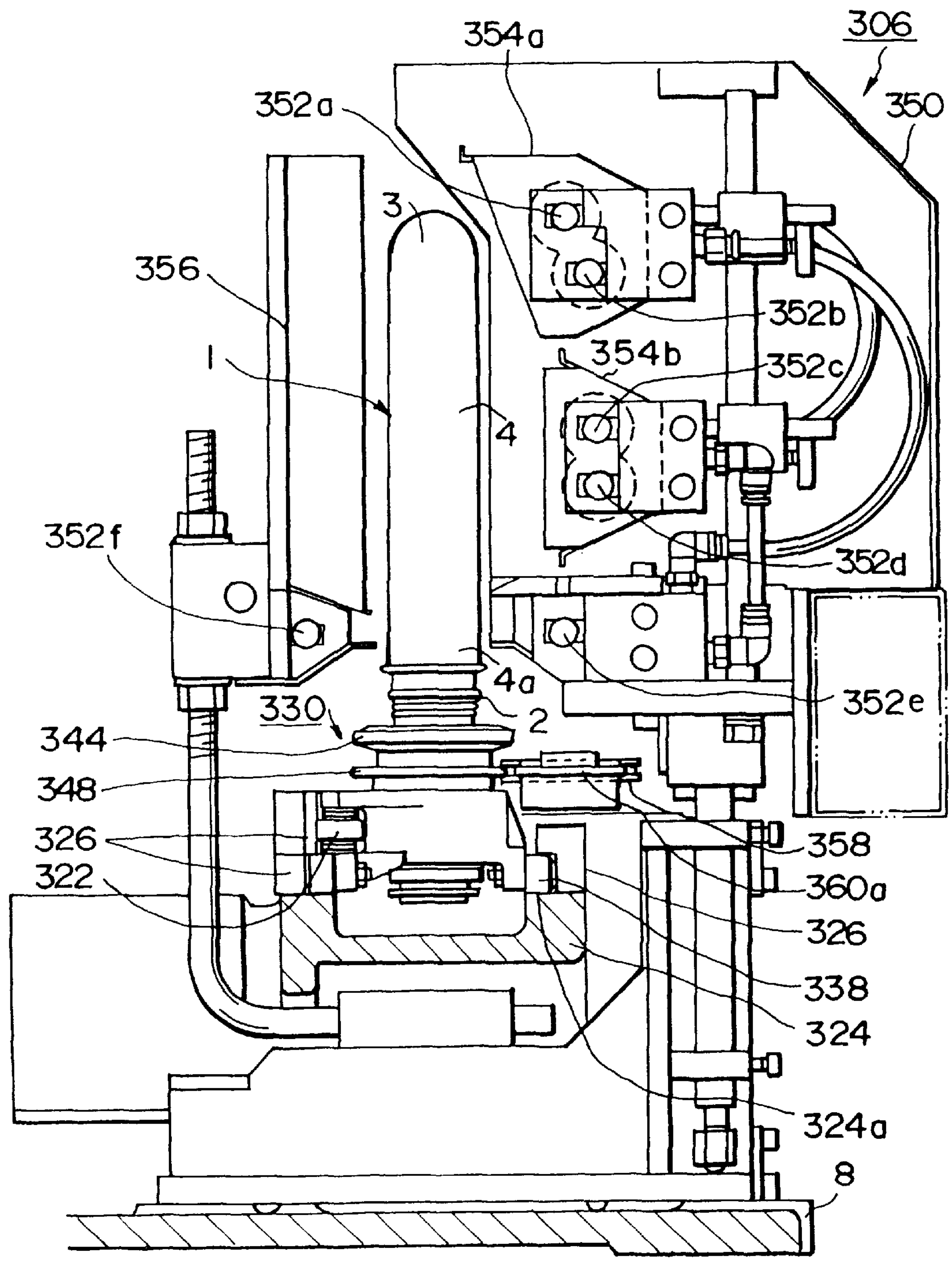
FIG. 19 is a side view in the preform carrying direction of a heating section.

On the other hand, in all parts of the carrying path outside the blow molding section 310, for example as shown in FIG. 19 showing the heating section 306, the carrier base 324 is provided below the carrying path. Upper surfaces of this carrier base 324 constitute cam surfaces 324*a*. Portions of the rails 326 disposed in the heating section 306 are so disposed that they cover the upper portions of the cam followers 338 and prevent the cam followers 338 from escaping from their travel paths. Because if the carrier base 324 were provided in the blow molding section 310 it would not be possible for a drawing rod and a blow core mold to be inserted from below into the preform 1, such a construction is not used.

An autorotation sprocket 348 is mounted on the cylinder 342 of the carrier member 330. When the preform 1 is in the heating section 306, this autorotation sprocket 348 rotates the preform 1 about its vertical axis; this point will be further discussed in the description of the heating section 306.

The driving sprocket 320*a* repeats an intermittent carrying movement wherein it moves by an amount corresponding to one pitch of the carrier members 330 fixed to the carrier chain 322 at a predetermined pitch and then stops for a predetermined period of time. By the preform 1 being received in an inverted state by the preform receiving section 304 of the blow molding station 300 the preform 1 is placed on the carrying surface 344 of the carrier member 330 and the carrying pin 346 is inserted into the neck portion 2 of the preform 1. When after that the driving sprocket 320*a* is driven and rotates, the carrier chain 322 meshing with the sprockets 320*a* to 320*d* moves and the carrier members 330 are thereby moved by one pitch. By this carrying operation being repeated, the preforms 1 received in the preform receiving section 304 are carried through the heating section 306 and the standby section 308 to the blow molding section 310, and here they are drawn and blow molded into bottles 6. After that the bottles 6 on the carrier members 330 are carried to the bottle ejecting section 312, and here the bottles 6 are ejected to outside the apparatus.

Heating Section 306

Next, the heating section 306 will be described with reference to FIG. 19 and FIG. 20.

The heating section 306 heats the preform 1 by means of radiant heat in a space enclosed by a heating box cover 350. As described above, in the apparatus of this preferred embodiment, the preform 1 can be amply cooled by the injection core mold 50 while it is being carried to the preform ejecting section 16 and in the preform ejecting section 16 until the injection core mold 50 is released from the preform 1. As a result, while the method is still a hot parison method, the preform 1 can be amply cooled and can be cooled to a temperature lower than is suitable for blow molding. For this reason, in the apparatus of this preferred embodiment, the preform 1 is heated in the heating section 306 provided in the blow molding station 300 until it reaches a temperature suitable for blow molding.

Inside the heating box cover 350 of the heating section 306 there are provided first to fourth barlike heaters 352*a* to 352*d* constituting a first heater set disposed spaced apart in the axial direction of the preform 1. The barlike heaters 352*a* to 352*d* are for example infrared heaters, and extend in the preform 1 carrying direction inside the heating box cover 350. The first and second barlike heaters 352*a* and 352*b* are partly surrounded by a focussing reflecting plate 354*a*, and heat especially the bottom portion 3 of the preform 1 with radiant heat. The third and fourth barlike heaters 352*c* and 352*d* are partly surrounded by a focussing reflecting plate 354*b* and heat especially the vicinity of the trunk portion 4 of the preform 1 with radiant heat. As shown in FIG. 19, a reflecting plate 356 is disposed on the other side of the carrying path facing the barlike heaters 352*a* to 352*d*.

Also, as shown in FIG. 19, fifth and sixth barlike heaters 352*e* and 352*f* constituting a second heater set are disposed one on either side of the preform 1 carrying path. These barlike heaters 352*e* and 352*f* are positioned at such a vertical height that they face the vicinity of the neck portion 2 of the preform 1 which is draw orientated in the blow molding section 310. The region of the preform 1 heated by these fifth and sixth barlike heaters 352*e* and 352*f* is the region which is immediately below the neck portion 2 when the preform 1 is upright, and will hereinafter be called the region below the neck 4*a*.

This region below the neck 4*a* is the region corresponding to the shoulder portion of the blow molded bottle 6. Consequently, when the preform 1 is positioned inside the blow mold 378, this region below the neck 4*a* is in the position closest to the surface of the blow cavity. Because of this, because the transverse axis orientation rate is low, the region below the neck 4*a* tends to become thick, but by amply heating the region below the neck 4*a* it is possible for it to be molded to the desired thinness. To this end, in this preferred embodiment, as well as the fifth and sixth barlike heaters 352*e* and 352*f* being disposed in positions where they face the region below the neck 4*a* of the preform 1, the heat-radiating surfaces of these heaters are disposed closer to the region below the neck 4*a* than the other heaters are to the preform 1.

Figure 20:
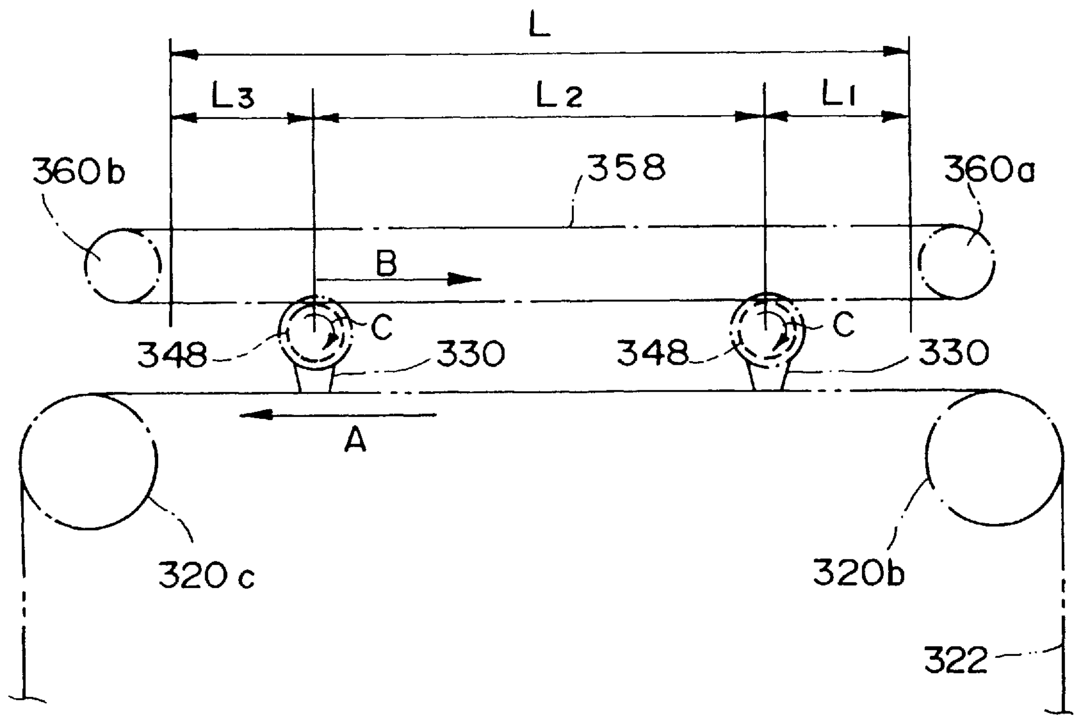
FIG. 20 is a plan view showing in outline a rotating carrier mechanism of the heating section.

As shown in FIG. 20, two sprockets 360*a* and 360*b* are disposed inside the heating box cover 350 of this heating section 306, and an autorotation drive chain 358 runs around these two sprockets 360*a* and 360*b*. This autorotation drive chain 358 also meshes with the autorotation sprocket 348 on the carrier member 330 that has been carried into the heating section 306. As a result of this arrangement, when the autorotation drive chain 358 is driven, the autorotation sprocket 348 rotates, this rotation is transmitted by way of the cylinder 342 to the preform 1, and the preform 1 is rotated.

As a result, when the preform 1 is carried into the heating section 306, the bottom portion 3 and the trunk portion 4 of the preform 1 receive radiant heat both from the barlike heaters 352*a* to 352*d* disposed on one side of the carrying path and from the reflecting plate 356 disposed on the other side of the carrying path, and because the preform 1 is rotated it receives heat substantially uniformly in the circumferential direction and therefore is heated uniformly in the circumferential direction. Also, the region below the neck 4*a* of the preform 1 is amply heated by the fifth and sixth barlike heaters 352*e* and 352*f* disposed close to the preform 1 on either side of the carrying path, and furthermore the rotation of the preform 1 ensures that this region below the neck 4*a* also is heated substantially uniformly in the circumferential direction.

Here, as shown in FIG. 20, when the preform 1 carrying direction is direction A, the direction of travel of the autorotation drive chain 358 where it meshes with the autorotation sprocket 348 of the carrier member 330 is made direction B, the opposite direction to direction A. The reason for this is as follows:

If the carrier chain 322 and the autorotation drive chain 358 were both to move at the same speed and in the same direction, direction A, there would be no relative movement between the autorotation sprocket 348 on the carrier member 330 side and the autorotation drive chain 358, and the preform 1 would not rotate at all. Even if the running speeds of the carrier chain 322 and the autorotation drive chain 358 were to be changed, depending on the sizes of the speeds the rotation of the preform 1 would either be extremely slow or would be reverse rotation. These situations will not occur if the autorotation drive chain 358 is driven at a higher speed than the carrier chain 322, but normally it is not desirable to rotate it at high speed in this way for reasons relating to moment. When rotated at high speed, if the preform 1 is slightly bent, this bend will be made greater by the strong moment it undergoes and this will cause uneven heating of the preform 1 and adversely affect the thickness distribution of the bottle 6.

Therefore, in the preferred embodiment shown in FIG. 20, by having the carrier chain 322 and the autorotation drive chain 358 run in opposite directions, when the preform 1 is carried in direction A the direction of its autorotation will always be the arrow C direction, and the problems described above are eliminated. The preform 1 rotates faster while it is being moved than when it is at a preform 1 stopping position.

Also, in this preferred embodiment, the total number of revolutions through which the preform 1 is rotated while it is inside the heating zone inside the heating box cover 350 is made a substantially integral number. In this preferred embodiment, 'while the preform 1 is in the heating zone' refers to the time that the preform 1 spends moving through the distances L1, L2 and L3 (L1+L2+L3=the heating zone length L), as shown in FIG. 20, and the time the preform 1 spends stopped at the two positions shown in FIG. 20. L1 is the distance over which the preform 1 is carried between entering the heating zone and the first stopping position; L2 is the distance between the two stopping positions; and L3 is the distance over which the preform 1 is carried between the second stopping position and leaving the heating zone. In this preferred embodiment, by making the number of turns through which the preform 1 autorotates in this carrying time and stopped time a substantially integral number of turns, the radiant heat from both sides of the preform 1 carrying path can be received substantially uniformly in the circumferential direction of the preform 1 and temperature variation in the circumferential direction of the preform 1 can thereby be prevented.

Also, according to this preferred embodiment, the operation of heating the preform 1 in this heating section 306 can be carried out after any temperature difference between the inner wall and the outer wall of the preform 1 has been sufficiently reduced. That is, in this preferred embodiment, the preform 1 is amply cooled from the inner wall side thereof by the injection core mold 50 in the preform molding station 10. As a result, the inner wall temperature of the preform 1 ejected in the preform ejecting section 16 is low, and the outer wall temperature is high. However, this preform 1 does not immediately enter the heating section after a short carrying period as in the case of a so-called hot parison or 1-stage apparatus but rather enters the heating section 306 after being transferred by the transfer station 200 and carried stepwise by the carrier member 330. As a result, after the preform 1 is released from the injection molds, a considerably longer cooling time elapses than in a so-called 1-stage apparatus before the preform 1 enters the heating section 306. Because of this, the difference between the temperatures of the inner and outer walls of the preform 1 can be amply moderated. This lack of temperature difference between the inner and outer walls is the same as in so-called cold parison or 2-stage apparatuses, but because unlike the case in these apparatuses the bottle 6 in this preferred embodiment can be blow molded from a preform 1 still containing heat from when it was injection molded, the preferred embodiment is superior in that less heat energy has to be given to the preforms and therefore energy can be saved.

Furthermore, with this preferred embodiment, by heating control of preforms 1 cooled to a temperature lower than a blow molding temperature (but considerably higher than room temperature), the stability of the preform temperature from molding cycle to molding cycle is improved and it is possible to reduce the variation in temperature occurring when a plurality of simultaneously injection molded preforms 1 are blow molded non-simultaneously. Also, in the apparatus of this preferred embodiment, the carrying pitch at which the preforms 1 are carried by the second circulatory carrier 302 is maintained at a fixed pitch. In contrast to this, in conventional cold parison or 2-stage molding machines, the carrying pitch is made smaller when the preforms are heated in the heating section and the carrying pitch is made larger when they enter the blow molding section. The reason why the carrying pitch is made smaller in the heating section is that because it is necessary to heat the preforms all the way from room temperature to the blow molding temperature the total number of preforms inside the heating section is made as large as possible in order to keep the apparatus as small as possible. The reason why the carrying pitch is made larger in the blow molding section, on the other hand, is that when a plurality of preforms are to be blow molded simultaneously the distance between the preforms has to be made at least greater than the maximum width of the molded product. Also, preforms about to be carried into the blow molding section and preforms having just been carried out of the blow molding section have to standby outside the blow mold clamping apparatus of the blow molding section. Because of this, in conventional 1-stage molding machines the carrying pitch has to be changed midway around the carrying path and the apparatus consequently is complex.

In contrast with this, in this preferred embodiment apparatus, because bottles 6 are blow molded from preforms 1 which still contain heat from when they were injection molded in the injection molding section 14, the amount of heat energy which has to be given to the preforms 1 in the heating section 306 is very small compared to a 2-stage case. As a result, the preforms 1 can be fully reheated to the blow molding temperature without the total number of preforms 1 in the heating section 306 being increased, and it is not necessary for the carrying pitch to be changed midway around the carrying path.

Standby Section 308

As shown in FIG. 1, in the carrying path between the heating section 306 and the blow molding section 310, one stop of the preform 1 performed by the normal carrying sequence carrying out intermittent drive is allocated to the standby section 308. The provision of this standby section 308 makes it possible to moderate the temperature distribution in the preform 1, which, being made of a synthetic resin, has poor thermal conductivity. Like the heating in the heating section 306 in this preferred embodiment apparatus, the heating of the preform 1 is normally carried out from the outside using radiant heat. Because of this, the temperature of the inner wall of the preform 1 becomes lower than the temperature of the outer wall. In the apparatus of this preferred embodiment, after the preform 1 is carried out of the heating section 306, by stopping the preform 1 at least once in the standby section 308 before it is carried into the blow molding section 310 it is possible to reduce this temperature difference between the inner and outer walls and the blow molding characteristics of the bottle 6 can thereby be stabilized.

During this temperature distribution moderation in the standby section 308 it is also possible to perform temperature adjustment of the preform 1 actively. By actively performing temperature adjustment of the preform 1 in the standby section 308 it is possible to obtain a temperature distribution which cannot be obtained just by heating the preform 1 while rotating it in the heating section 306.

Figure 23:
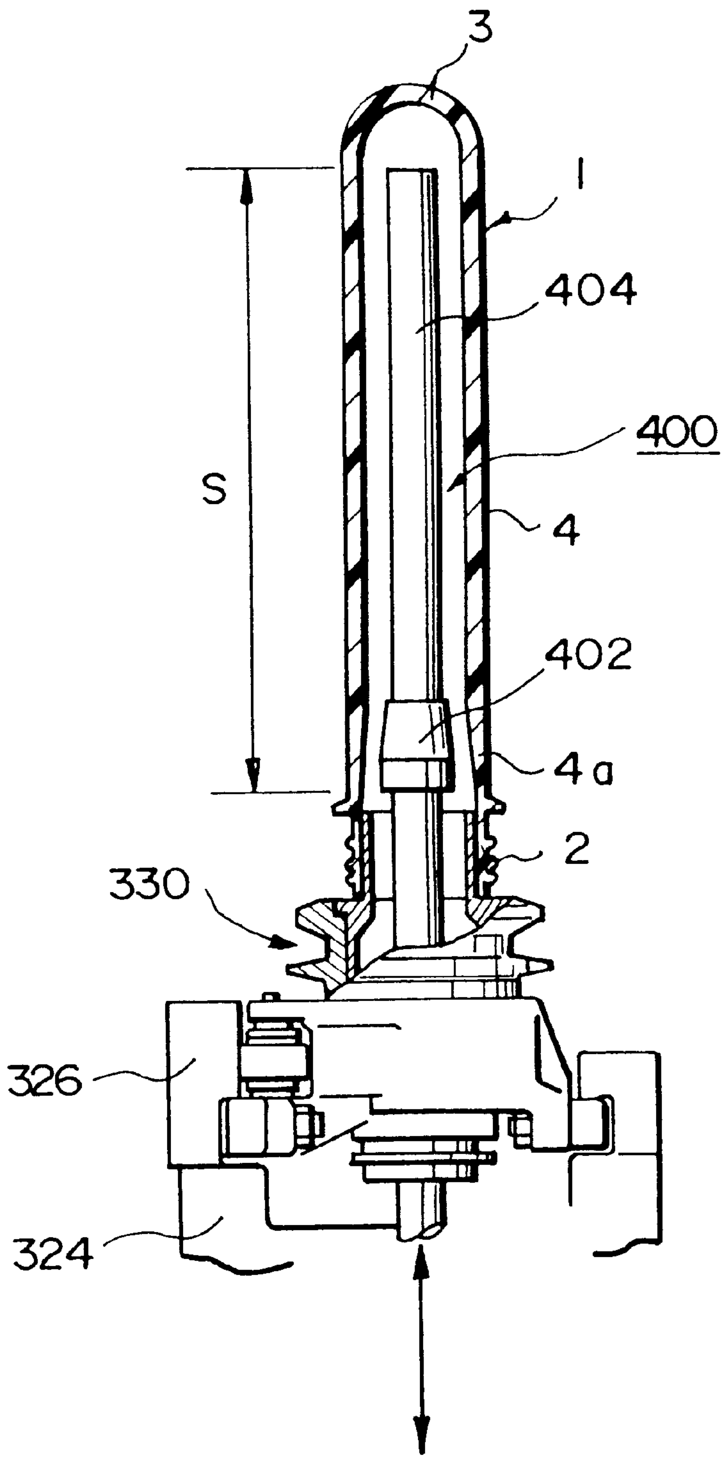
FIG. 23 is a sectional view of a temperature adjusting core disposed in a standby section.

As a temperature adjusting member disposed in the standby section 308, for example a temperature adjusting core 400 which is inserted from below the preform 1 into the preform 1 and performs temperature adjustment from the inner wall side over a temperature adjustment region S can be used, as shown in FIG. 23. This temperature adjusting core 400 has a first temperature adjusting core 402 which performs temperature adjustment of the region below the neck 4*a* of the preform 1 from the inner wall side thereof. This temperature adjusting core 400 also has a second temperature adjusting core 404 which performs temperature adjustment on the trunk portion excluding the region below the neck 4*a*. As described above, because it is necessary to adjust the temperature of the region below the neck 4*a* to a higher temperature than other regions, in FIG. 23 the first temperature adjusting core 402 has a larger diameter than the second temperature adjusting core 404. Alternatively, a layer consisting of a material which radiates heat of such a wavelength that it is easily absorbed by the resin material from which the preforms 1 are molded (for example PET) may be coated onto the first temperature adjusting core 402.

Figure 24:
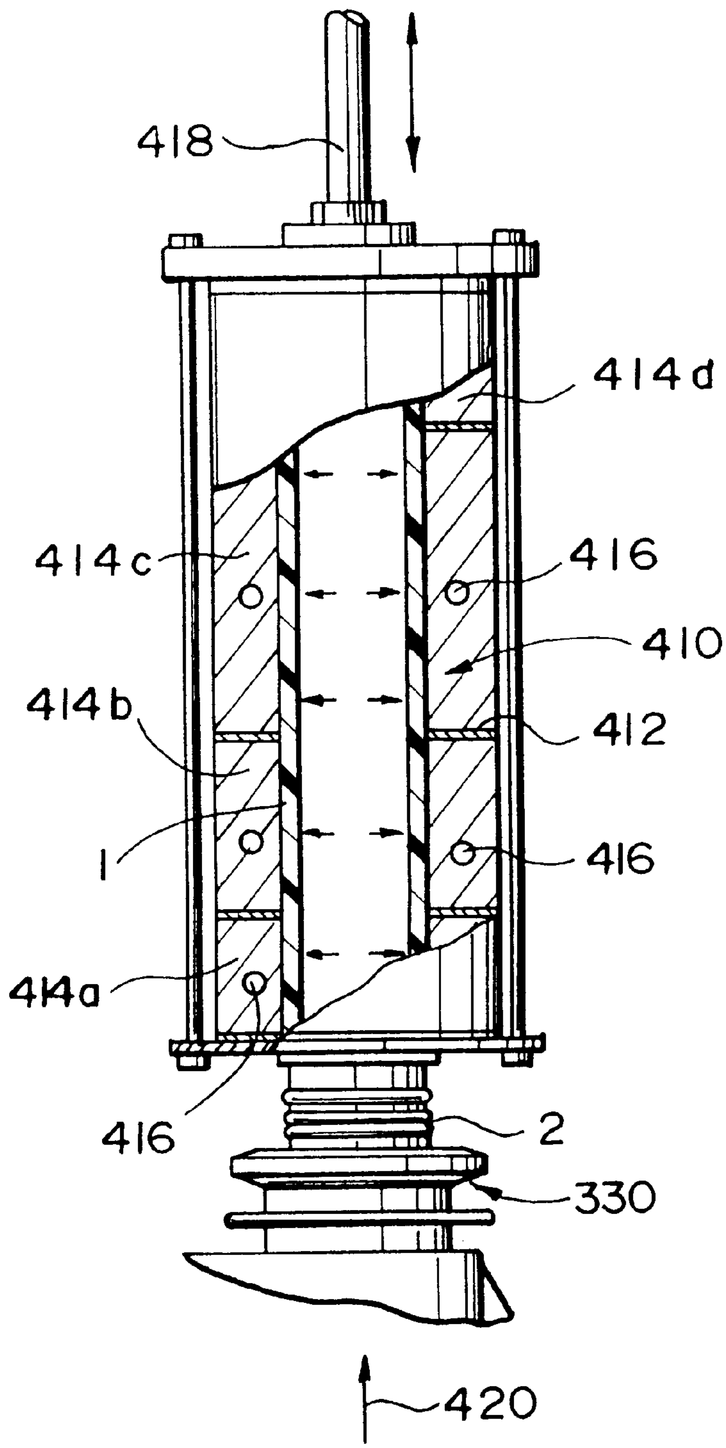
FIG. 24 is a sectional view of a temperature adjusting pot disposed in the standby section.

As shown in FIG. 24, the temperature adjusting member can also be made a temperature adjusting pot 410 having a cylindrical portion which can be positioned around the preform 1. In this case, the temperature adjusting pot 410 has blocks 414*a* to 414*d* divided into zones in the axial direction of the preform 1 by thermal insulation 412, and each of the blocks 414*a* to 414*d* has an independent temperature adjusting fluid passage 416 whereby independent temperature control of each zone is carried out. Because the temperature adjusting pot 410 can be so positioned that is covers the preform 1, a temperature distribution stepped in the axial direction of the preform 1 can be certainly obtained. By this means, it is possible to for example adjust the region below the neck 4*a* to a high temperature and adjust the bottom portion 3 to a low temperature. As shown in FIG. 14, it is also possible to apply an internal pressure to the preform 1 by introducing air into the preform 1 in the direction of the arrow 420 and thereby bring the outer wall of the preform 1 and the blocks 414*a* to 414*d* into contact and facilitate the temperature adjustment.

Figure 25:
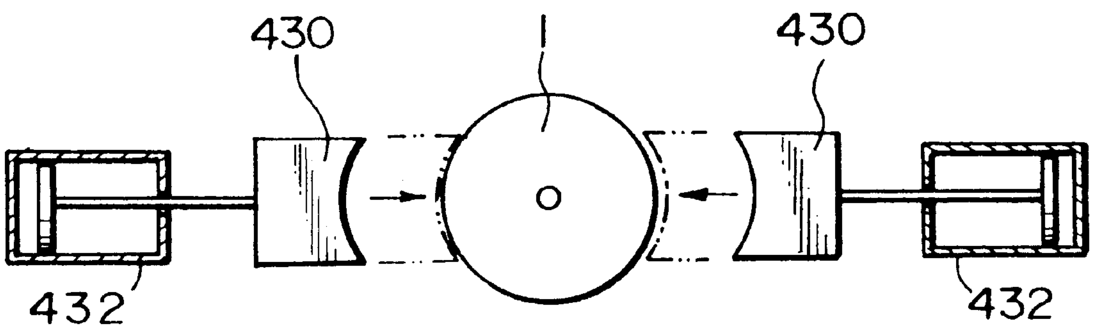
FIG. 25 is a sectional view of local temperature adjusting members disposed in the standby section.
Figure 26:
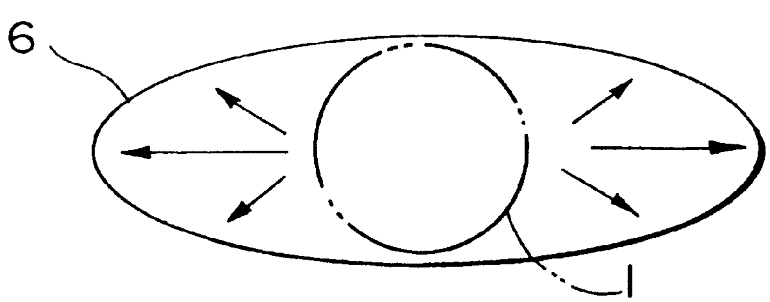
FIG. 26 is a view of a flat container blow molded after the temperature adjusting shown in FIG. 25.

Also, as this kind of temperature adjusting member, it is possible to use a member which in one or a plurality of locations in the circumferential direction of the preform 1 extend in the axial direction of the preform 1 and impart the preform 1 with a temperature distribution in the circumferential direction thereof. For example, as shown in FIG. 25, it is possible for example at both sides of the preform 1 to dispose a pair of cooling members 430 along the axial direction of the preform 1 and bring them into contact with the side wall of the trunk portion of the preform 1 using air cylinders 432 or the like. When this is done, the preform 1 is given a temperature distribution in the circumferential direction, and for example as shown in FIG. 26 it is possible to fully secure the wall thickness required of the high transverse axis drawing rate region of a flat bottle 6. This kind of measure can be applied not only to flat containers but also to for example square containers. When a temperature distribution in the circumferential direction of the preform 1 is to be imparted, besides bringing a cooling member into contact with the preform 1 it is also possible to position a heating member in the vicinity of the preform 1.

Blow Molding Section 310

The blow molding section 310 has two blow mounting plates 370 mounted on the machine bed 8, one on either side of the preform 1 carrying path. As shown in FIG. 4, for example four tie bars 372 are mounted crossing between these two blow mounting plates 370. Two blow mold clamping plates 374 which move horizontally along the four tie bars 372 are mounted between the blow mounting plates 370. These two blow mold clamping plates 374 are opened and closed symmetrically about a vertical line by a blow mold clamping mechanism 376, comprising for example hydraulic pistons, mounted on the blow mounting plates 370.

A pair of split molds 378*a* and 378*b* constituting the blow mold 378 are mounted on these two blow mold clamping plates 374. In the case of the preferred embodiment apparatus shown in FIG. 1, because the number n of bottles simultaneously blow molded is n=1, a cavity for one bottle is formed in the pair of split molds 378*a* and 378*b*. In the case of the preferred embodiment apparatus shown in FIG. 21, because the number n of bottles simultaneously blow molded is n=2, cavities for two bottles are formed in the pair of split molds 378*a* and 378*b*.

A cylinder mounting plate 380 is mounted at a position midway along the upper two tie bars 372, and a bottom mold driving cylinder 382 is mounted on this cylinder mounting plate 380. This bottom mold driving cylinder 382 raises and lowers a bottom mold 384. In this preferred embodiment, because the bottle 6 is blow molded from a preform 1 which is inverted, the bottom mold 384 is made movable up and down above the preform 1.

Thus in this preferred embodiment, while raising productivity by injection molding N=4 preforms 1 simultaneously in the injection molding section 14 of the preform molding station 10, by only molding n=1 bottle 6 at a time in the blow molding section 310 it is possible to raise the operation rate of the blow cavity mold 378. Also, by reducing the number of cavities in the blow cavity mold 378, which is a relatively expensive type of mold, mold costs, molds being consumable items, can be reduced. Furthermore, in this preferred embodiment apparatus, because in the preform molding station 10 the preforms 1 are amply cooled before they are released from the injection molds, and because enough cooling time is provided thereafter for the temperature difference between the inner and outer walls of the preforms 1 to be moderated before the preforms 1 are heated to the blowing temperature, the uniformity of the temperature distribution of the retained heat in the preforms 1 can be increased and the stability of the blow molding can be greatly improved.

Bottle Ejecting Section 312

As shown in FIG. 1 and FIG. 4, the bottle ejecting section 312 is disposed in the carrying path of the carrier members 330 carried by the second circulatory carrier 302 between the blow molding section 310 and the preform receiving section 304. This bottle ejecting section 312 has a neck holding mechanism 390 having for example a similar construction to that of the neck holding mechanisms 232 employed in the inverting and handing over mechanism 230. This neck holding mechanism 390 holds the neck portion of the inverted bottle 6 by means of a pair of holding members. As shown in FIG. 3 and FIG. 4, there are also provided a raising and lowering drive device 392 which raises and lowers this neck holding mechanism 390 and an inverting drive device 394 which inverts the neck holding mechanism through an angle of 180°. By the neck holding mechanism 390 being raised by the raising and lowering drive device 392, the neck portion of the bottle 6 is pulled upward off the carrying pin 346 of the carrier member 330. After that, by this holding mechanism 390 being rotated through 180° by the inverting device 394, the bottle 6 is brought into an upright state to one side of the machine bed 8, and by the pair of holding members of the neck holding mechanism then being opened, the bottle 6 is discharged to outside the apparatus.

When Simultaneous Molding Numbers are N=6, n=2

FIG. 21 is a plan view of a preferred embodiment apparatus wherein the simultaneous molding numbers are N=6, n=2. The preferred embodiment shown in FIG. 21 differs from the preferred embodiment apparatus shown in FIG. 1 in the following points:

First, because the blow molding section 310 is to simultaneously blow mold two bottles 6 at a time from among the N=2 simultaneously injection molded preforms, the blow cavity mold 378 has two blow cavities spaced an array pitch P3 apart. The array pitch at which the carrier members 330 carried by the second circulatory carrier 302 are spaced apart is the same pitch as the array pitch P3 of the blow cavities in the blow molding section 310. Also, the total number of carrier members fitted to the carrier chain 322 constituting the second circulatory carrier 302 is twenty, twice as many as in the case of the preferred embodiment shown in FIG. 1. Enough preforms 1 for two blow molding cycles, 2×n=4 preforms 1, are stopped inside the heating section 306. In the standby section 308, enough preforms 1 for one blow molding cycle, n=2 preforms 1, are made to standby. The carrier chain 322 and the carrier members 330 used in the preferred embodiment apparatus of FIG. 21 are the same as those used in the preferred embodiment apparatus shown in FIG. 1, and it is only the positions and pitch at which the carrier members 330 are fitted to the carrier chain 322 that are different.

Figure 22:
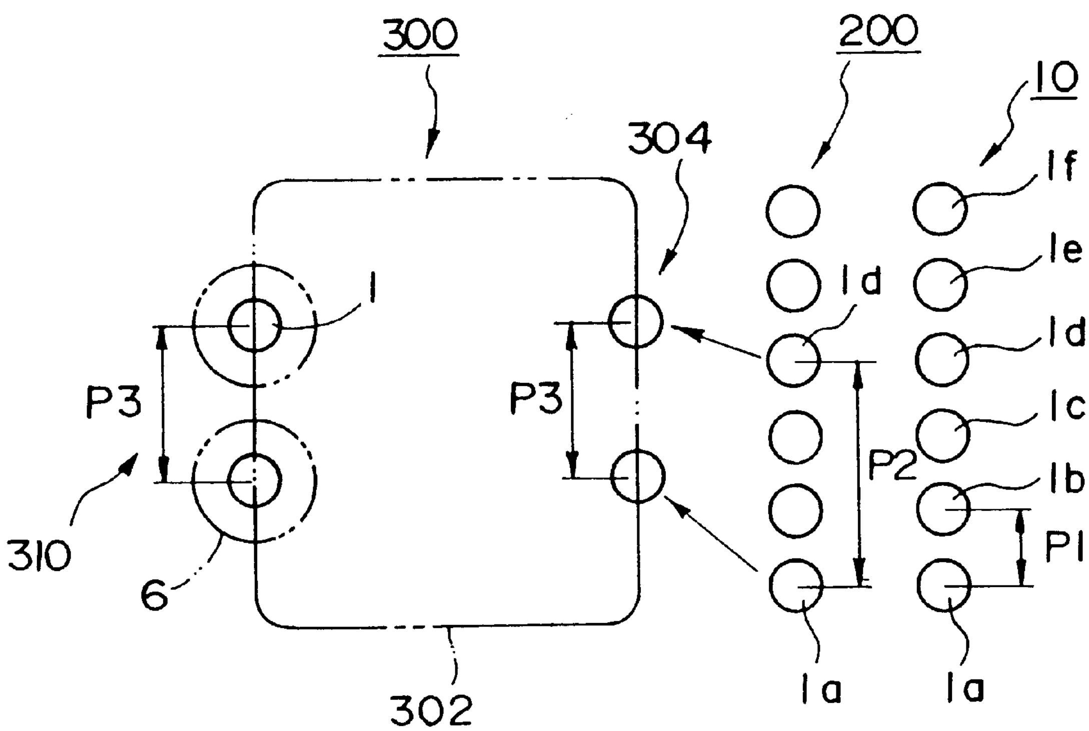
FIG. 22 is a view illustrating the operation of a transfer station transferring preforms while converting their pitch.

In the preferred embodiment apparatus shown in FIG. 21, in the transfer station 200, the number n=2 of preforms 1 simultaneously blow molded in the blow molding section 310 are simultaneously transferred. For this, a transfer pitch converting operation, which will now be explained with reference to FIG. 22, is necessary. In FIG. 22, six preforms 1 simultaneously injection molded in the injection molding section 14 of the preform molding station 10 are shown as preform 1*a* to preform 1*f*. In FIG. 22, the first row on the right shows the array pitch of the preforms 1 injection molded in the preform molding station 10. The array pitch of the preforms 1 at this time is the same as the array pitch P1 of the core pins 52 of the injection molding section 14. The second row from the right in FIG. 22 shows the state of the preforms 1 before they are received by the inverting and handing over mechanism 230 of the transfer station 200. The array pitch of the preforms 1 here is also the pitch P1. The third row from the right in FIG. 22 shows the state of two preforms 1 received by the preform receiving section 304 of the blow molding station 300. The transfer of these two preforms 1 is carried out using the two pairs of neck holding members 234 shown in FIG. 4. The array pitch of the preforms 1 received by the preform receiving section 304 is the same as their array pitch P3 in the blow molding section 310.

Here, in the transfer station 200, when the two preforms 1 are transferred by the two pairs of neck holding members 234, first, for example the first and fourth preforms 1*a* and 1*d* are held. That is, the two preforms 1*a* and 1*d* are held and the two preforms 1*b* and 1*c* are ignored this time. As a result, the array pitch P2 of the neck holding members 234 at this time is P2=3×P1. This pitch conversion from the pitch P2 to the pitch P3 is carried out by the array pitch of the two neck holding mechanisms 232 being converted by the pitch change drive device 254 shown in FIG. 14. Similarly thereafter, by the second and fifth preforms 1*b* and 1*e* being transferred and then the third and sixth preforms 1*c* and 1*f* being simultaneously transferred after that, the operation of transferring of the six simultaneously molded preforms 1 is completed.

When the simultaneous molding numbers N, n are made N=4, n=2, the transfer operation in the transfer station 200 is carried out with pitch conversion from the pitch P2=2×P1 to the pitch P3 being performed and two preforms being held while the one preform between them is ignored until the next time.

In the case of the preferred embodiment apparatus shown in FIG. 21, the ratio (N/n) of the simultaneous molding numbers N and n is 3. According to studies carried out by the present inventors, in the case of general-purpose medium-sized containers of capacity about 1 to 3 liters having relatively small mouths (the diameter of the opening of the neck portion 2 being about 28 to 38 mm), the ratio of the simultaneous molding numbers N, n should ideally be set to N:n=3:1. The reason for this is as follows: The size of a preform for molding a general-purpose medium-sized container, although some elements do vary according to the application, is within a substantially fixed range. This is because the preform size is determined by the drawing factor necessary to obtain the drawing characteristics of polyethylene terephthalate (PET) resin and the drawing factor necessary for molding stability. Although there is some variation depending on the use for which the container is intended, research carried out by the present inventors has shown that the maximum thickness of the trunk portion 4 of a preform 1 used for a general-purpose medium-sized container lies within the range 3.0 to 4.0 mm.

Generally, the blow molding cycle time (the time required between when a preform 1 is carried into the blow molding section 310 and when the next preform 1 is carried in) required for blow molding by a blow molding machine is approximately 3.6 to 4.0 seconds.

In the case of this preferred embodiment, wherein the preforms 1 are cooled by the injection core mold 50 even after being released from the injection cavity mold 42 and then blow molded thereafter, the time required for molding a preform for this kind of general-purpose medium-sized container is shortened to about ¾ of that of a conventional injecting stretch blow molding machine, and an injection molding cycle time of approximately 10 to 15 seconds is sufficient.

Therefore, if this injection molding cycle time (approx. 10 to 15 seconds) is T1 and the blow molding cycle time (3.6 to 4.0 seconds) is T2, the ratio T1:T2 is about 3:1, and it is established that in order to efficiently mold general-purpose medium-sized containers the simultaneous molding numbers N and n should ideally be set in accordance with this ratio. When a large container is to be molded from a thicker preform an injection molding cycle time of 16 seconds or more is suitable and the ratio N:n can be set to around 4:1. When a small container is to be molded from a thin preform the injection molding cycle time is shortened and consequently the ratio N:n can be set to for example 4:2.

Thus, if N/n is set to 3, the injection molding cycle and the blow molding cycle will be suitable for molding medium-sized containers, for which the market demand is the greatest, and a blow molding machine with little waste in the molding cycles can be realized.

Intermediate Preform Discharge Mechanism

In this preferred embodiment, as shown in FIG. 2 and FIG. 3, a preform dropout opening is provided in the part of the machine bed 8 where the transfer station 200 is disposed. This preform dropout opening 8*a* is continuous with a chute 8*b* formed inside the machine bed 8, and this chute 8*b* leads to a preform discharge opening 8*c* formed in the side of the machine bed 8.

With this type of hot parison blow molding machine there are various situations wherein it is desirable that the transfer to the blow molding station 300 of the preforms 1 being molded in the preform molding station 10 be stopped. For example, when the whole blow molding machine is started up, until the preform 1 injection molding characteristics stabilize it is preferable that the imperfect preforms 1 being produced at this stage not be supplied to the blow molding station 300. Also, when for some reason trouble has arisen in the blow molding station 300 it is preferable that only the operation of the blow molding station 300 be stopped and that the operation of the preform molding station 10 not be stopped so that preforms 1 continue to be molded. This is because there are various heating parts in the preform molding station 10 and consequently once the preform molding station 10 is shut down a considerable amount of time is required to start it up again.

In this preferred embodiment, when such a situation arises, the preforms 1 continuing to be injection molded in the preform molding station 10 are discharged to the side of the machine bed 8 through the above-mentioned preform dropout opening 8*a*, the chute 8*b* and the discharge opening 8*c* instead of being transferred to the blow molding station 300 by the transfer station 200. This preform 1 discharging operation can for example be carried out by the pair of neck holding members 234 of the inverting and handing over mechanism 230 taking hold of the preforms 1 as usual but then, without inverting them through 180°, moving the preforms 1 for example horizontally to a predetermined position above the preform dropout opening 8*a* in the machine bed 8 and then simply releasing the preforms 1.

This preferred embodiment, as sequence control modes, has a bottle molding operating mode wherein the preforms 1 are transferred to the blow molding station 300 and blow molding of the bottles 6 is performed, and a preform molding operating mode wherein the preforms 1 are not transferred to the blow molding station 300. It is possible to change over from the normal bottle molding operating mold for example automatically when an abnormality is detected by a sensor or the like or by an operator flicking a manual switch. When the apparatus is switched over to the preform molding operating mode the operation of the transfer station 200 changes over to the operation of carrying the preforms 1 to the preform dropout opening 8*a* as described above, and no further preforms 1 are transferred to the blow molding station 300.

This invention is not limited to the preferred embodiment described above, and various modifications can be made within the scope of the invention.

In the preferred embodiment described above, the rotary disc 30 carried both the injection core mold 50 and the neck cavity mold 60, but for example in cases such as when the shape of the neck portion 2 does not form an undercut with respect to the mold-release direction it is not always necessary to use the neck cavity mold 60. When the neck cavity mold 60 is not used, after the preforms 1 are released from the injection cavity mold 42 in the injection molding section 14, the preforms 1 can be carried to the preform ejecting section 16 by the injection core mold 50 alone. Because the preforms 1 contract around the core pins 52 of the injection core mold 50 as they cool they can be smoothly released from the injection cavity mold 42, and the preform 1 can be carried by the injection core mold 50 even without there being any undercut at the neck portion 2.

In the preform ejecting section 16, to remove the injection core mold 50 from the preforms 1, for example the core pins 52 of the injection core mold 50 can be provided with a function enabling them to introduce air for ejection into the preforms 1. When this is done, in the preform ejecting section 16, by blowing air from the core pins 52 into the preforms 1 after they are cooled by the injection core mold 50, the preforms 1 can be caused to drop downward by this air pressure.

What is claimed is:

1. An injection stretch blow molding apparatus comprising:

a preform molding section for molding preforms and a blow molding section for blow molding containers from the preforms retaining heat from when the preforms were injection molded, and switching means for switching to either one of a container molding operating mode and a preform molding operating mode, wherein at a location in a path along which the preforms are carried from the preform molding section to the blow molding section there is a discharge guide section for guiding preforms which are not to be carried to the blow molding section off of the carrying path.

2. The injection stretch blow molding apparatus according to claim 1, wherein:

the apparatus further comprises a machine bed on which the preform molding section and the blow molding section are mounted, and the discharge guide section comprises:

a preform dropout opening formed in an upper surface of the machine bed; and a chute which guides the preforms from the dropout opening to a side of the machine bed.

3. An injection stretch blow molding method wherein there are three steps of injection molding preforms in a preform molding section, carrying the preforms to a blow molding section, and at a blow molding section, blow molding containers from the preforms retaining heat from when the preforms were injection molded, the method further comprising the steps of:

switching to either a container molding operating mode wherein the three steps are carried out or a preform molding operating mode; and when the preform molding operating mode is switched to, part way along the preform carrying path leading to the blow molding section, discharging the preforms being molded in the preform molding section are discharged from the carrying path.

* * * * *